US011630196B2

(12) United States Patent
Li et al.

(10) Patent No.: US 11,630,196 B2
(45) Date of Patent: Apr. 18, 2023

(54) RANGE DEPENDENT FALSE ALARM REDUCTION IN RADAR OBJECT DETECTION

(71) Applicant: QUALCOMM Incorporated, San Diego, CA (US)

(72) Inventors: Junyi Li, Franklin Park, NJ (US); Dan Zhang, San Diego, CA (US); Kapil Gulati, Belle Mead, NJ (US)

(73) Assignee: QUALCOMM INCORPORATED, San Diego, CA (US)

( * ) Notice: Subject to any disclaimer, the term of this patent is extended or adjusted under 35 U.S.C. 154(b) by 262 days.

(21) Appl. No.: 17/216,191

(22) Filed: Mar. 29, 2021

(65) Prior Publication Data

US 2022/0011423 A1 Jan. 13, 2022

Related U.S. Application Data

(60) Provisional application No. 63/051,118, filed on Jul. 13, 2020.

(51) Int. Cl.
*G01S 13/32* (2006.01)
*G01S 7/288* (2006.01)
(Continued)

(52) U.S. Cl.
CPC .............. *G01S 13/32* (2013.01); *G01S 7/288* (2013.01); *G01S 13/505* (2013.01); *G01S 13/584* (2013.01); *G01S 7/2883* (2021.05)

(58) Field of Classification Search
CPC .................................................. G01S 13/5246
See application file for complete search history.

(56) References Cited

U.S. PATENT DOCUMENTS 5,546,089 A * 8/1996 Talbot ................. G01S 13/5246
342/162
5,644,315 A * 7/1997 Long ................... G01S 13/5246
342/99

(Continued)

FOREIGN PATENT DOCUMENTS

EP 0100012 A2 * 2/1984 ......... G01S 13/5246
EP 1712931 10/2006
(Continued)

OTHER PUBLICATIONS

"Electronics Warfare and Radar Systems Engineering Handbook"; no author given; Oct. 2013; Naval Air Warfare Center Weapons Division; Point Mugu, California, USA. (Year: 2013).*

(Continued)

*Primary Examiner* — Bernarr E Gregory
(74) *Attorney, Agent, or Firm* — Weaver Austin Villeneuve & Sampson LLP

(57) ABSTRACT

False alarms in RADAR processing are reduced. One or more transforms may be performed to generate an array of spectrum values for a first domain spanning at least one of a range axis, a direction of arrival (DoA) axis, or a velocity axis. One or more spectrum values may be obtained from the array of spectrum values, wherein for each of the one or more spectrum values, (1) the spectrum value is associated with a range estimate, and (2) the spectrum value exceeds a range-dependent maximum threshold established based on a quartic function of the range estimate. The one or more spectrum values identified as exceeding the range-dependent maximum threshold may be excluded, or one or more reduced-magnitude values obtained, to generate an array of modified spectrum values for the first domain, used to generate a range estimate, a DoA estimate, or a velocity estimate, or any combination thereof.

30 Claims, 16 Drawing Sheets

(51) Int. Cl.
    *G01S 13/50*     (2006.01)
    *G01S 13/58*     (2006.01)
    *G01S 13/00*     (2006.01)

(56) References Cited

U.S. PATENT DOCUMENTS

2014/0176361 A1\*   6/2014   Dizaji ................ G01S 13/5246
                                                                            342/93
2018/0045810 A1     2/2018   Ygnace et al.

FOREIGN PATENT DOCUMENTS

WO     WO2009/027718 A1 \*   3/2009   ......... G01S 13/5246
WO     WO 2019166351         9/2019

OTHER PUBLICATIONS

International Search Report and Written Opinion—PCT/US2021/037029—ISA/EPO—dated Oct. 1, 2021.

\* cited by examiner

RANGE DEPENDENT FALSE ALARM REDUCTION IN RADAR OBJECT DETECTION

CROSS-REFERENCE TO RELATED APPLICATIONS

This application claims the benefit of U.S. Provisional Application No. 63/051,118, filed Jul. 13, 2020, entitled "RANGE DEPENDENT FALSE ALARM REDUCTION IN RADAR OBJECT DETECTION" which is incorporated herein by reference in its entirety.

FIELD OF DISCLOSURE

Aspects of the disclosure relate to Radio Detection and Ranging (RADAR) and specifically to reducing false alarms in RADAR estimates.

DESCRIPTION OF RELATED ART

RADAR technology has wide application across different industries such as automotive, medical, telecommunications, AR/VR, and many others. One advantage of using RADAR is that it may be capable of operating in environments where other types of sensing technology might fail or be inadequate. For example, automotive RADAR, which can be an important component of the automotive sensor's suite, may be capable of operating in environments where visual-based sensors (e.g., camera and LIDAR) perform poorly, such as during heavy precipitation, reduced visibility, etc.

However, RADAR performance may be significantly degraded in the presence of active interferers. For instance, frequency modulated continuous wave (FMCW) RADARs in general, and automotive FMCW in particular, may be prone to false alarm detection caused by active interferers operating in the same frequency band. With vast proliferation of the autonomous vehicles equipped with RADAR sensors, the probability of such false alarms is dramatically increased. There is a need for improved techniques for reducing false alarms in RADAR estimates.

BRIEF SUMMARY

Methods, apparatuses, systems, and non-transitory computer-readable medium storing instructions therein are presented for reducing false alarms in RADAR processing. In one aspect, a method comprises obtaining a digital signal resulting from mixing (1) a received signal associated with reflection of a RADAR transmit signal and (2) a local version of the RADAR transmit signal. The method further comprises performing one or more transforms using the digital signal to generate an array of spectrum values for a first domain spanning at least one of a range axis, a direction of arrival (DoA) axis, or a velocity axis. The method further comprises identifying one or more spectrum values from the array of spectrum values, wherein for each of the one or more spectrum values, (1) the spectrum value is associated with a range estimate, and (2) the spectrum value exceeds a range-dependent maximum threshold established based on a quartic function of the range estimate. The method further comprises excluding, or obtaining one or more reduced-magnitude values for, the one or more spectrum values identified as exceeding the range-dependent maximum threshold, to generate an array of modified spectrum values for the first domain spanning the at least one of the range axis, the DoA axis, or the velocity axis. The method further comprises using the array of modified spectrum values to generate a range estimate, a DoA estimate, or a velocity estimate, or any combination thereof.

In one aspect, an apparatus comprises a memory and at least one processor coupled to the memory. The at least one processor is configured to obtain a digital signal resulting from mixing (1) a received signal associated with reflection of a RADAR transmit signal and (2) a local version of the RADAR transmit signal. The at least one processor is further configured to perform one or more transforms using the digital signal to generate an array of spectrum values for a first domain spanning at least one of a range axis, a direction of arrival (DoA) axis, or a velocity axis. The at least one processor is further configured to identify one or more spectrum values from the array of spectrum values, wherein for each of the one or more spectrum values, (1) the spectrum value is associated with a range estimate, and (2) the spectrum value exceeds a range-dependent maximum threshold established based on a quartic function of the range estimate. The at least one processor is further configured to exclude, or obtain one or more reduced-magnitude values for, the one or more spectrum values identified as exceeding the range-dependent maximum threshold, to generate an array of modified spectrum values for the first domain spanning the at least one of the range axis, the DoA axis, or the velocity axis. The at least one processor is further configured to use the array of modified spectrum values to generate a range estimate, a DoA estimate, or a velocity estimate, or any combination thereof.

In one aspect, a non-transitory computer-readable medium storing instructions therein for execution by one or more processing units is presented. The stored instructions comprise instructions to obtain a digital signal resulting from mixing (1) a received signal associated with reflection of a RADAR transmit signal and (2) a local version of the RADAR transmit signal. The stored instructions further comprise instructions to perform one or more transforms using the digital signal to generate an array of spectrum values for a first domain spanning at least one of a range axis, a direction of arrival (DoA) axis, or a velocity axis. The stored instructions further comprise instructions to identify one or more spectrum values from the array of spectrum values, wherein for each of the one or more spectrum values, (1) the spectrum value is associated with a range estimate, and (2) the spectrum value exceeds a range-dependent maximum threshold established based on a quartic function of the range estimate. The stored instructions further comprise instructions to exclude, or obtain one or more reduced-magnitude values for, the one or more spectrum values identified as exceeding the range-dependent maximum threshold, to generate an array of modified spectrum values for the first domain spanning the at least one of the range axis, the DoA axis, or the velocity axis. The stored instructions further comprise instructions to use the array of modified spectrum values to generate a range estimate, a DoA estimate, or a velocity estimate, or any combination thereof.

In one aspect, a system comprises means for obtaining a digital signal resulting from mixing (1) a received signal associated with reflection of a RADAR transmit signal and (2) a local version of the RADAR transmit signal. The system further comprises means for performing one or more transforms using the digital signal to generate an array of spectrum values for a first domain spanning at least one of a range axis, a direction of arrival (DoA) axis, or a velocity axis. The system further comprises means for identifying one or more spectrum values from the array of spectrum values, wherein for each of the one or more spectrum values, (1) the spectrum value is associated with a range estimate, and (2) the spectrum value exceeds a range-dependent maximum threshold established based on a quartic function of the range estimate. The system further comprises means for excluding, or obtaining one or more reduced-magnitude values for, the one or more spectrum values identified as exceeding the range-dependent maximum threshold, to generate an array of modified spectrum values for the first domain spanning the at least one of the range axis, the DoA axis, or the velocity axis. The system further comprises means for using the array of modified spectrum values to generate a range estimate, a DoA estimate, or a velocity estimate, or any combination thereof.

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

FMCW RADAR System and Interference

Figure 1:
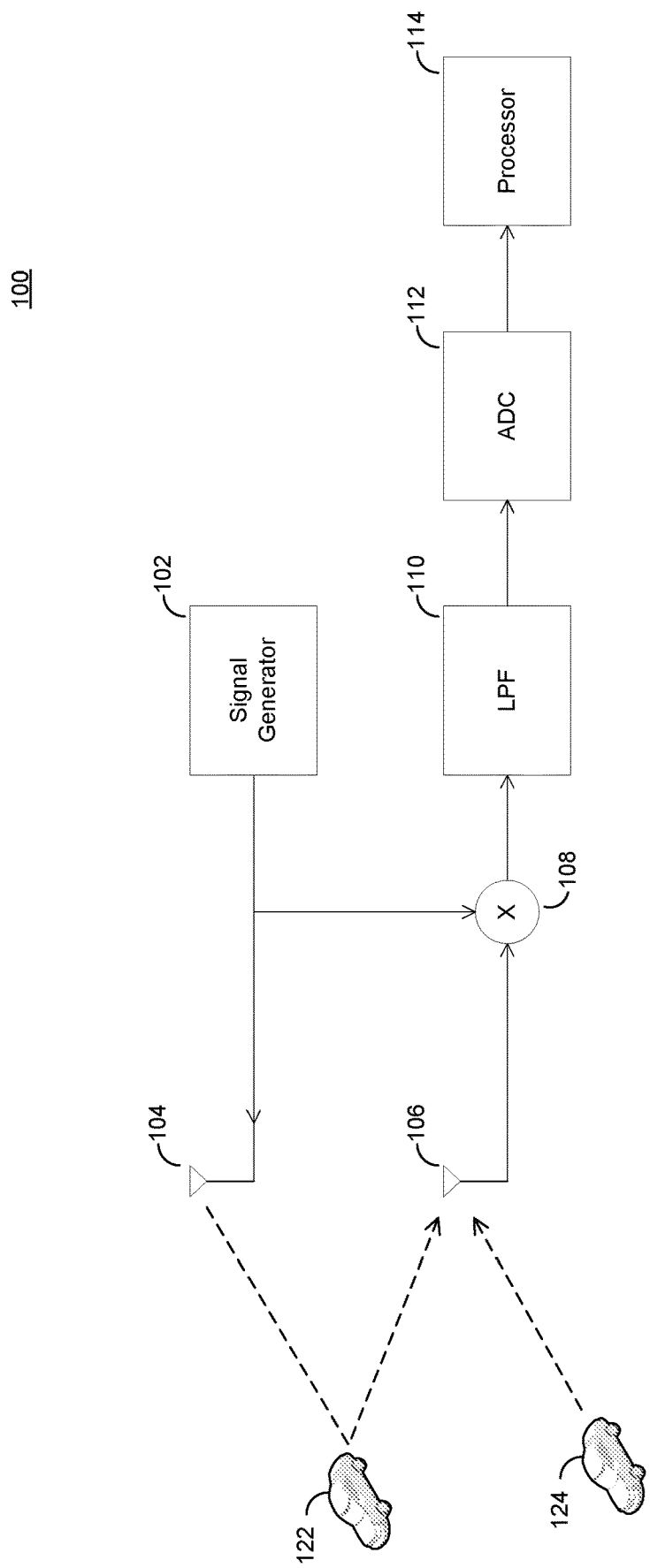
FIG. 1 illustrates a simplified diagram of a RADAR system 100 that may incorporate one or more embodiments.

FIG. 1 illustrates a simplified diagram of a RADAR system 100 that may incorporate one or more embodiments. RADAR system 100 may operate to obtain range, direction of arrival (DoA), velocity, and/or other information pertaining to a target 122, in the presence of an active interferer 124. In the embodiment shown in the figure, RADAR system 100 may comprise a signal generator 102, a transmit (TX) antenna 104, a receive (RX) antenna 106, a mixer 108, a low pass filter (LPF) 110, an analog-to-digital converter (ADC) 112, and a processor 114. While only one target 122 and one interferer 124 are shown for simplicity of illustration, it is contemplated that RADAR system 100 may obtain range, velocity, angle estimation, and/or other information pertaining to more than one target, in the presence of more than one active interferer.

Signal generator 102 generates a RADAR TX signal, which is provided to TX antenna 104. Transmit antenna 104 may transmit the RADAR TX signal toward target 122. The signal reflects off of one or more surfaces of target 122, and the reflected signal reaches RX antenna 106 after a time delay, which is proportional to the roundtrip distance between system 100 and target 122 as well as the speed of the signal, generally calculated as the speed of light, c. The received signal from RX antenna, often referred to as the radio frequency (RF) signal, is provided to one input of mixer 108. A local version of the RADAR TX signal is provided to another input of mixer 108. Mixer 108 performs a signal multiplication operation on ("mixes") the two input signals and generates an output signal. In other words, the received RF signal, which has experienced the roundtrip delay, is mixed down using the local version of the same signal. Mixer 108 outputs the resulting mixed down signal, often referred to as the intermediate frequency (IF) signal. LPF 110, which may be characterized by a cutoff frequency, is then used to filter the IF signal, to generate a low pass-filtered signal. ADC 112 is then used to sample and digitize the low pass-filtered signal, to generate a digital signal that represents the IF signal. The digital signal is then provided to processor 114, which can perform further downstream processing to eventually generate information relating to target 122 such as range, velocity, and direction-of-arrival (DoA) estimations.

While not shown in this figure, RADAR system 100 may include more than one set of RX components, such as RX antennas, in order to perform angle-of-arrival estimation. For example, the collection of RX components comprising receive antenna 106, mixer 108, LPF 110, and ADC 112 may together form one RX processing chain. Multiple instances of such RX processing chain may be included in RADAR system 100 to generate multiple ADC outputs, which may be provided to processor 114, to facilitate DoA estimations.

Interferer 124 may also implement a RADAR system, by transmitting its own RADAR TX signal, which can represent an interference signal that also reaches RX antenna 106. As a result, the received signal obtained from RX antenna 106 is a combination of the intended reflected signal from target 122 as well as the interference signal from interferer 124. It is this interference-impacted RF signal that is mixed down by mixer 108, filtered by LPF 110, sampled by ADC 112, and forwarded as a digitized signal to processor 114. The presence of such interference can significantly degrade the quality of any range, velocity, and/or DoA estimation produced by system 100. Indeed, the signal from interferer 124 can generate an outsized false alarm detection, as discussed in more detail in section below.

Figure 2:
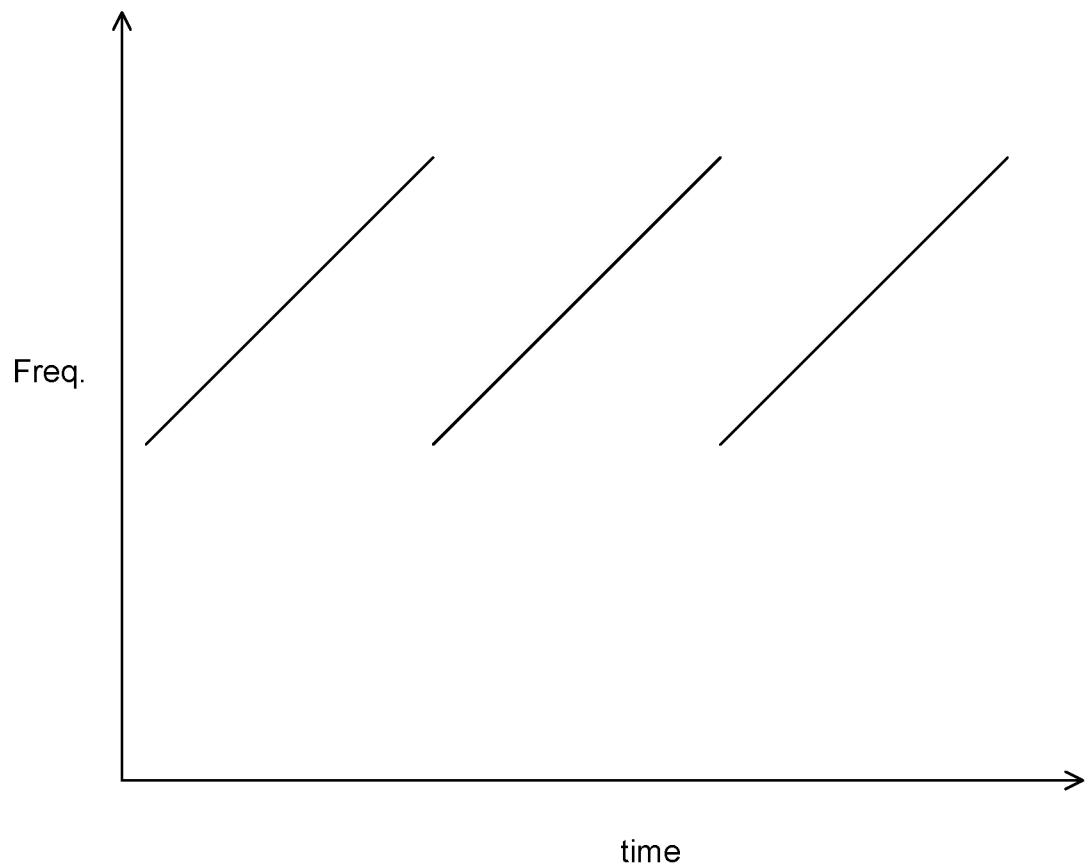
FIG. 2 is a frequency-versus-time plot of a frequency modulated continuous wave (FMCW) TX signal, exhibiting characteristic "chirps," according to an embodiment of the disclosure.

FIG. 2 is a frequency-versus-time plot of a frequency modulated continuous wave (FMCW) TX signal, exhibiting characteristic "chirps," according to an embodiment of the disclosure. The y-axis represents frequency amplitude, and the x-axis represents time. Each chirp is a continuous wave (e.g., sinusoidal) signal with an instantaneous frequency that changes over time, hence the name frequency-modulated, continuous wave signal. In this particular example, the frequency increases as a linear function of time. Other types of FMCW signals are possible, including "chirps" whose frequency linearly decrease over time, "saw tooth" signals whose frequency alternate between linearly increasing and linearly decreasing over time, etc. Also, while an FMCW signal is illustrated in this figure, the techniques presented in the present disclosure may be applicable to other types of RADAR TX signals, including other types of continuous wave (CW) signals, depending on the environment to be accommodated and the performance characteristics desired.

Figure 3:
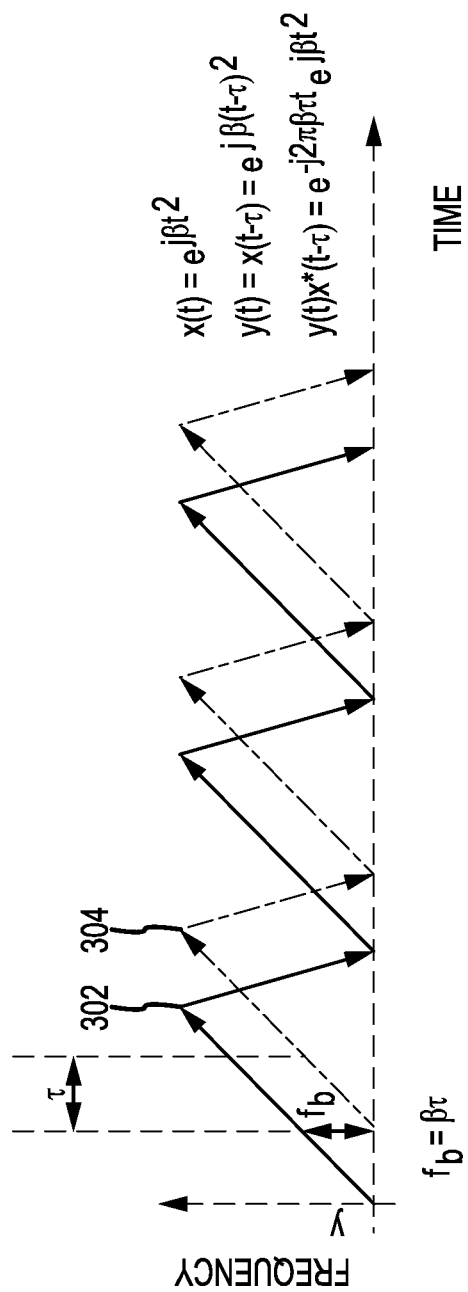
FIG. 3 is a frequency-versus-time plot of a FMCW TX signal 302 and a received, reflected version of the same signal (i.e., FMCW RX signal 304)

FIG. 3 is a frequency-versus-time plot of a FMCW TX signal 302 and a received, reflected version of the same signal (i.e., FMCW RX signal 304). Again, the y-axis represents frequency amplitude, and the x-axis represents time. The FMCW TX signal 302 may be expressed as:

$$x(t)=e^{j\beta t^2} \quad \text{(Eq. 1)}$$

The FMCW RX signal 304 may be expressed as:

$$y(t)=x(t-\tau)=e^{j\beta(t-\tau)^2} \quad \text{(Eq. 2)}$$

Here, $\beta$ represents the slope of the change in frequency over change in time of the FMCW waveform (i.e.

$$\left(\text{i.e., } \beta = \frac{\Delta f}{\Delta t}\right).$$

The time delay $\tau$ represents the relative delay between the FMCW TX signal 302 and the FMCW RX signal 304.

The output of mixer 108 in FIG. 1 is the result of mixing the FMCW TX signal 302 and FMCW RX signal 304. This resulting signal may also be referred to as the IF signal, as discussed previously. The IF signal can be expressed as:

$$y(t)x^*(t)=e^{j2\pi\beta\tau t}e^{j\beta\tau^2} \quad \text{(Eq. 3)}$$

The IF signal may exhibit a "beat" frequency $f_b=\beta\tau$. Typically, if the IF signal is sampled into a digitized format, a Fast Fourier Transform (FFT) may be performed on the IF signal to convert it into the frequency domain. This may be referred to as performing a "range transform." Each peak in the output of the range transform may represent a "beat" frequency $f_b$. Note that the beat frequency, expressed as $f_b=\beta\tau$, is directly related to the time delay $\tau$ between the FMCW TX signal 302 and the FMCW RX signal 304. Based on this relationship, the RADAR system 100 can use the range spectrum to detect the distance to the target 122, by determining the beat frequency $f_b$, then determining the time delay $\tau$, and finally determining the roundtrip distance of the reflected path traveled by the signal (by taking into account the known propagation speed of the signal, e.g., the speed of light, c). There may be multiple beat frequencies $f_b$ observed in the IF signal. Each beat frequency $f_b$ may correspond to one or more potential targets located at the detected range (i.e., distance) indicated by the beat frequency. Thus, extracting the beat frequency $f_b$ is key to performing the "range" estimate on the received RADAR signal.

Figure 4:
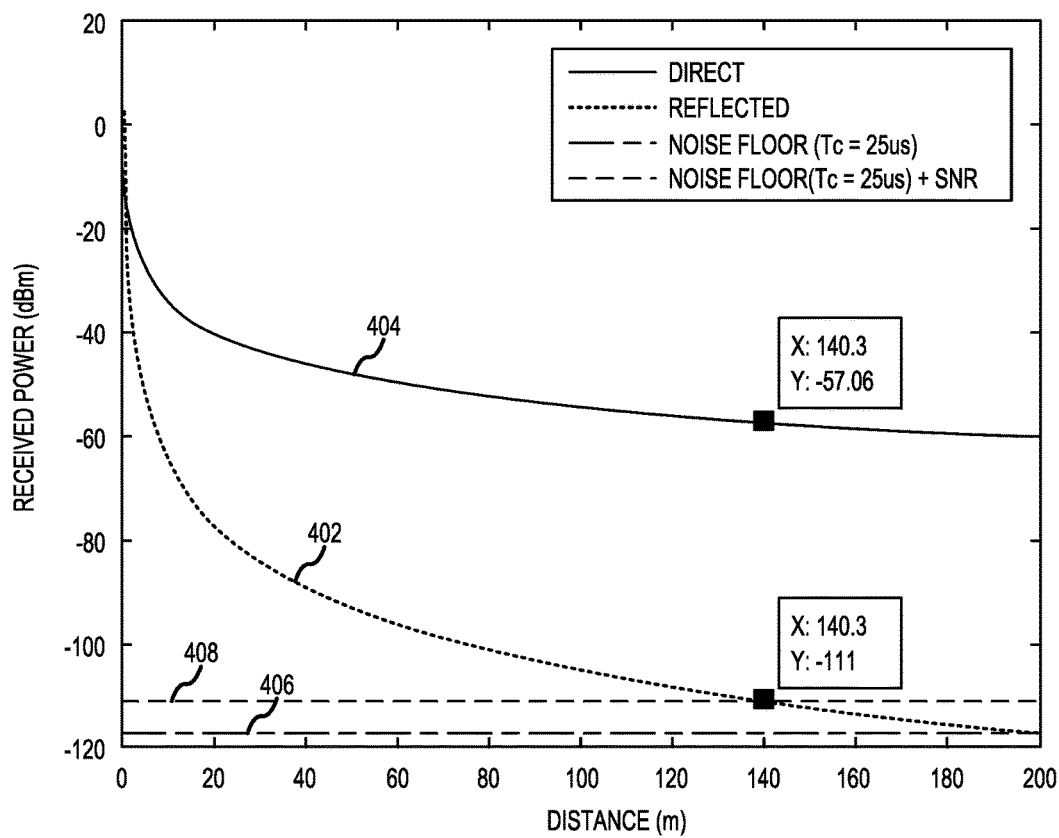
FIG. 4 is a received power vs. distance plot of illustrative signals that might be received at RADAR system 100.

FIG. 4 is a received power vs. distance plot of illustrative signals that might be received at RADAR system 100. Here, the y-axis indicates the received power in units of decibel-milliwatts (dBm). The x-axis indicates distance in meters (m). Curve 402 represents the power of the signal received at the RADAR system 100 from the reflection from target 122. Curve 404 represents the power of the signal received at the RADAR system 100 from the signal directly transmitted from interferer 124. The plot also includes a noise floor curve 406 associated with a chirp period Tc, as well as a noise floor curve 408 associated with a chirp period Tc and assuming a particular signal-to-noise (SNR) ration.

As can be seen in the plot, the power of the signal coming from interferer 124 (curve 404) is many orders of magnitude higher than that of the signal coming from target 122 (curve 402). Just as an example, at a distance of 140.3 meters, a signal power of −57.06 dBms is expected for the signal coming from interferer 124. At the same distance of 140.3 meters, a much lower signal power of −111 dBms is expected for the signal coming from target 122. The difference between the power of the two signals, at this distance, is 53.94 decibels (dB). Such a dramatic difference in received signal power occurs because the interference signal travels a direct path from interferer 124 to RADAR system 100 and experiences signal decay proportional to the distance squared (i.e. $R^2$ decay), whereas the intended signal travels a reflected (desired) path from RADAR system 100, to target 122, and back to RADAR system 100, and experiences signal decay proportional to the distance to the fourth power (i.e., $R^4$ decay).

Figure 5:
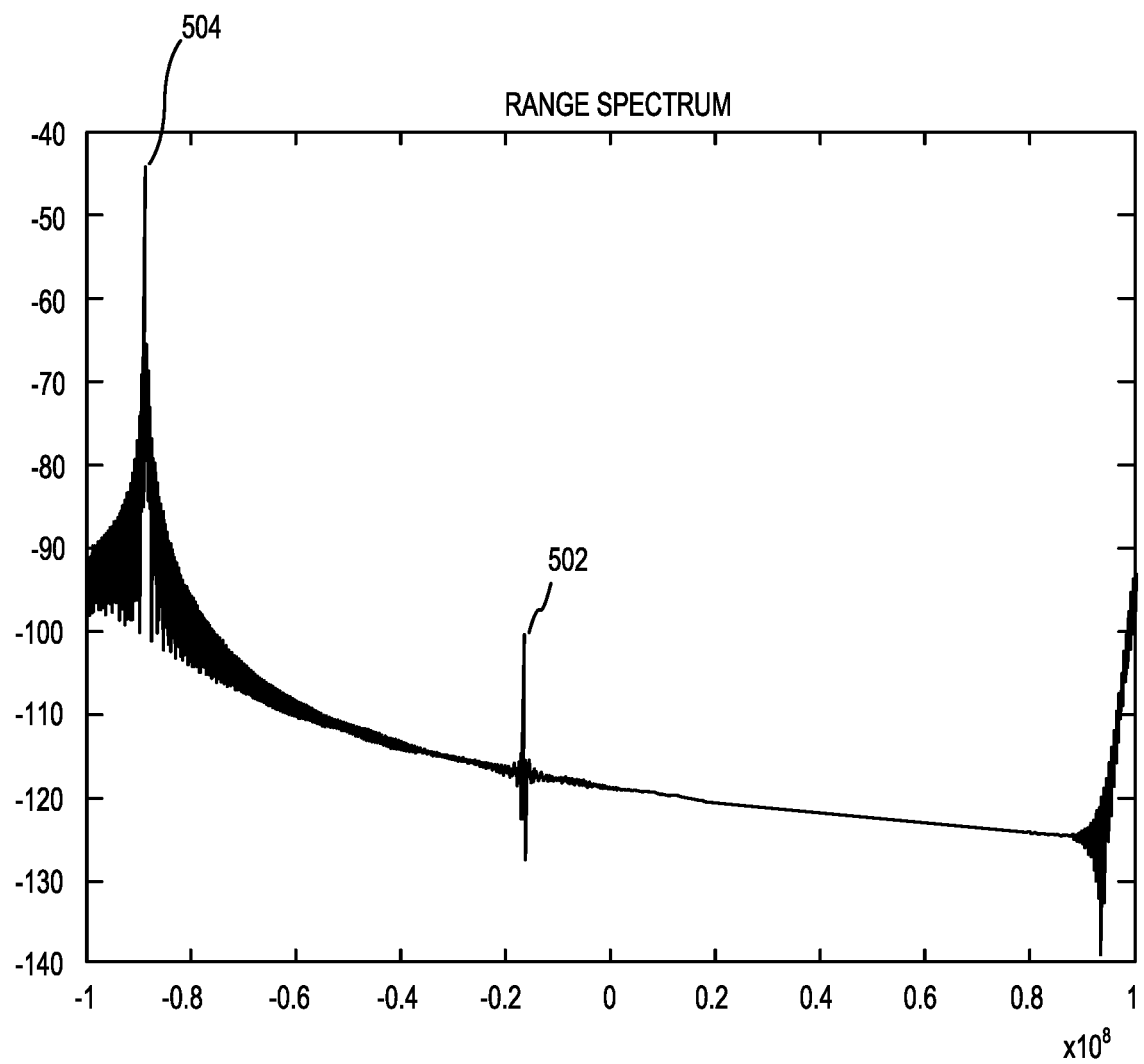
FIG. 5 is a plot of a range spectrum generated by RADAR system 100 in the presence of both the target 122 and the interferer 116 in FIG. 1.

FIG. 5 is a plot of a range spectrum generated by RADAR system 100 in the presence of both the target 122 and the interferer 116 in FIG. 1. The y-axis represents the magnitude of the range spectrum. The x-axis represents the frequency domain of the range spectrum, e.g., in units of radians per sample for a digitized signal. FIG. 3 shows that the range spectrum computed by RADAR system 100 may reveal a real target 502 and a false target 504, which is also referred to as a "ghost target."

Origins of such "ghost targets" are further described below. For many RADAR waveforms, such as frequency modulated continuous wave (FMCW), multiple RADAR TX signals sent from different sources may be indistinguishable from one another. For example, RADAR system 100 in FIG. 1 may transmits a first FMCW signal toward target 122 and receive a reflection signal. At the same time, RADAR system 100 may receive a second FMCW signal directly from an interferer 124. The first FMCW signal and the second FMCW signal may not be distinguishable from one another, in term of their waveform structure. This is problematic because RADAR system 100 detects targets by correlating its transmit signal with its received signal. That is, the detector relies on the correlation (e.g., same waveform, with a relative delay) between the first FMCW signal and the received, reflected version of the first FMCW signal to detect target 122. Information regarding target 122 such as range (i.e., distance to the target), velocity, and direction of arrival (DoA) can thus be determined. The presence of the second FMCW signal can create a significant false alarm detection. The first FMCW signal (from RADAR system 100) is not at all correlated to the second FMCW signal (from interferer 124). However, the detector performs the same detection operations, as if the second FMCW signal had been a reflected version of the first FMCW signal, reflected off of another target—which in reality does not exist. Since there is no correlation between the first FMCW signal and the second FMCW signal, the range, velocity, and DoA estimates generated by the detector are meaningless. Not only are detections of such "ghost targets" false, they are particularly strong given the $R^2$ signal decay rate associated with the direct path from the interferer 124, as compared with the $R^4$ signal decay rate associated with the reflected path to and from the target 122. This is illustrated by the relatively large magnitude of the false target 208, as compared to the real target 502 shown in FIG. 504.

Range, Doppler, and DoA FFTs

Figure 6:
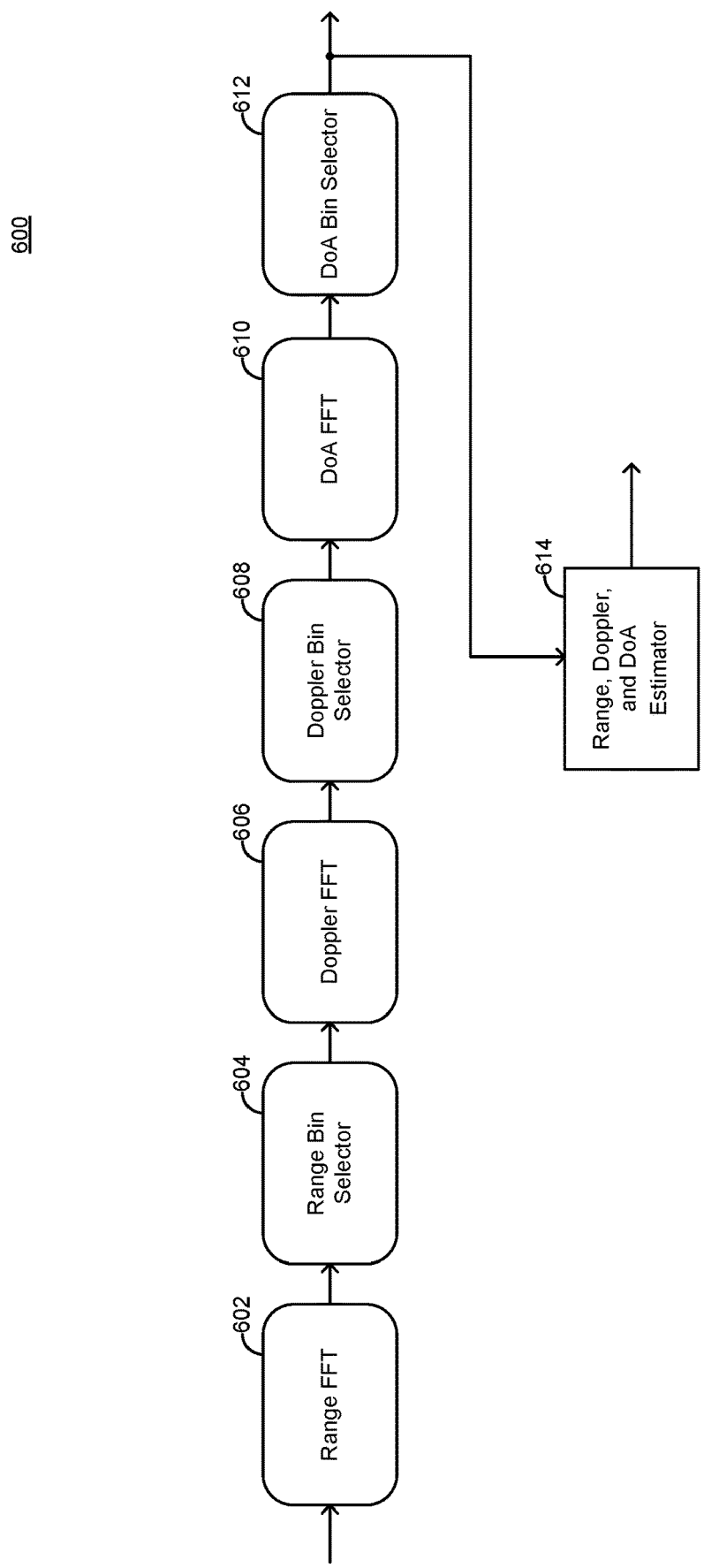
FIG. 6 is a block diagram of a RADAR data processing chain 600 comprising transform blocks and bin selectors for spectrum operations performed along three different domains spanning a range axis, a velocity axis, and a direction of arrival (DoA) axis, according to an embodiment of the disclosure.

FIG. 6 is a block diagram of a RADAR data processing chain 600 comprising transform blocks and bin selectors for spectrum operations performed along three different domains spanning a range axis, a velocity axis, and a direction of arrival (DoA) axis, according to an embodiment of the disclosure. RADAR data processing chain 600 comprises a range Fast Fourier Transform (FFT) block 602, a range bin selector 604, a Doppler FFT block 606, a Doppler bin selector 608, a direction-of-arrival (DoA) FFT block 610, and a DoA bin selector 612.

Figure 7A:
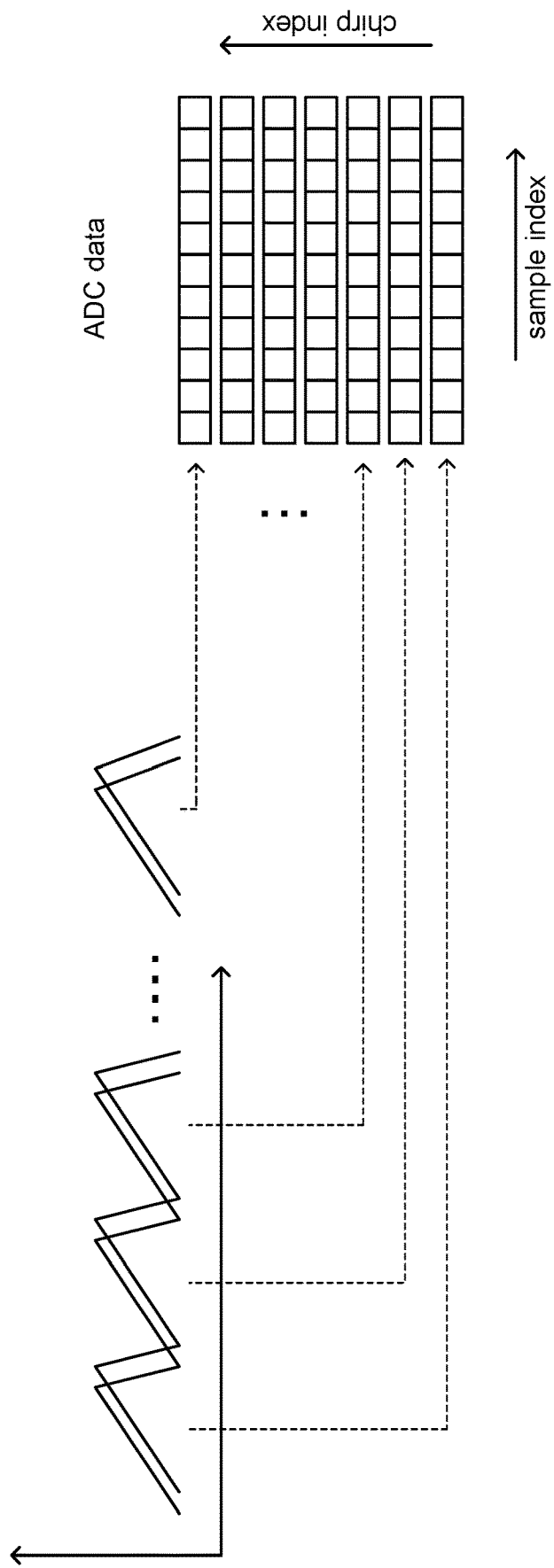
FIG. 7A illustrates the input data for the RADAR data processing chain 600, according to an embodiment.

FIG. 7A illustrates the input data for the RADAR data processing chain 600, according to an embodiment. Generally, range FFT block 602 receives the IF signal. For example, the IF signal may be the result of mixing the FMCW TX signal 302 with the FMCW RX signal 304, shown in FIG. 3 and characterized in Eq. 3, discussed above. The IF signal may be in the form of digitized samples from the analog-to-digital converter, such as ADC unit 112 in FIG. 1. Thus, the IF signal is characterized by a "beat" frequency $f_b$. Samples of the IF signal are divided into segments, each segment having a duration equal to the length of a "chirp" of the FMCW signal. For ease of illustration, FIG. 7A shows that this length is 11 samples (i.e., sample index=0, 1, 2, . . . 10), but in practice the duration of a chirp may correspond to a different number of samples. Thus, the segments of IF signal samples may be visualized in a two-dimensional arrangement, with the sample index along a first dimension and the chirp index along a second dimension. In other words, each row of the two-dimensional arrangement corresponds to the IF samples obtained for one chirp duration of the output of the ADC. For ease of illustration, 7 chirps of IF data are shown as being processed this way (i.e., chirp index=0, 1, 2, . . . , 6), but in practice the number of chirps of IF data processed may differ.

Figure 7C:
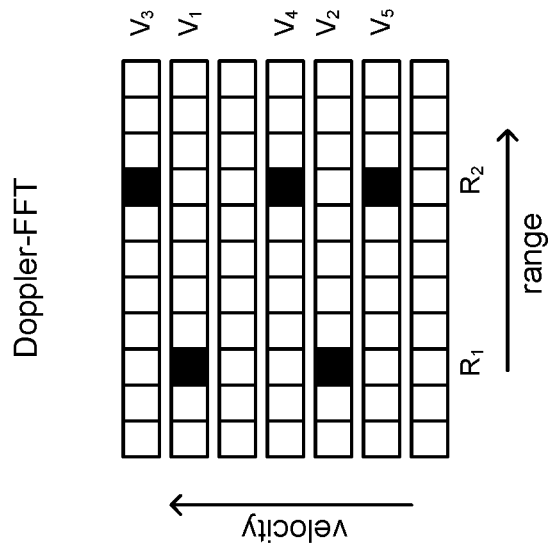
FIG. 7C illustrates the operation of the Doppler FFT block 606, according to an embodiment.
Figure 7B:
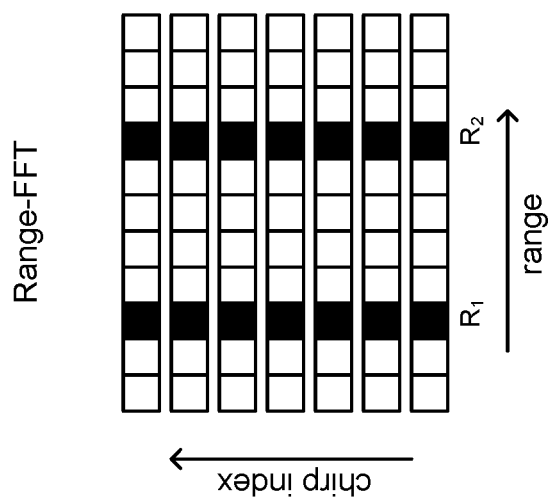
FIG. 7B illustrates the operation of the range FFT block 602, according to an embodiment.

FIG. 7B illustrates the operation of the range FFT block 602, according to an embodiment. Range FFT block 602 performs an FFT operation along the "range" axis, which transforms each row of IF samples from the time domain to the frequency domain. A similar operation is performed for every row, i.e., for each chirp index. In this example, because there are 7 chirps worth of IF samples processed, 7 FFTs are performed. Each of these FFTs may be referred to as a "range FFT." The output of each range FFT represents a particular sampling of the spectrum of the IF signal and is thus referred to as a "range spectrum." After the range FFT is performed, the positions along each row no longer corresponds to sample indices (i.e., time domain) but instead corresponds to frequency bins (i.e. frequency domain).

Range bin selector 604 evaluates each range spectrum to detect any peaks that may be present. There may be different ways to detect such peaks. A threshold may be used, such that any bin having a magnitude greater than the threshold may be deemed a peak. In some embodiments, range bin selector 604 may implement a constant false alarm rate (CFAR) detector. Various CFAR detection algorithms may be employed. One example is a cell-averaging CFAR (CA-CFAR) algorithm. In a CA-CFAR implementation, a cell under test (CUT) is evaluated against a threshold. Here, a "cell" corresponds to a range spectrum bin. The threshold is determined based on a block of cells defined around the CUT. For instance, the threshold may be based on the sum or average of the spectrum values of all the cells within a block of cells around the CUT. The CA-CFAR thus uses a moving window average (or sum) of the spectrum values in neighboring cells, as the magnitude threshold. The CA-CFAR detector is provided as just an example. Other types of CFAR detectors may also be used.

Once range bin selector 604 determines which bins are selected as containing peaks, the identity of the selected range bins may be outputted. A detected peak in the range spectrum indicates the possible presence of a beat frequency $f_b$. As discussed earlier, the beat frequency $f_b$ can be used to compute the range, i.e., distance from the RADAR system 100 to the target 122. Thus, each peak detected may yield a range estimate. At the estimated range, i.e., distance, associated with a detected beat frequency $f_b$, there may be one or more targets present. As shown in FIG. 7B, the present example yields two range bins, $R_1$ and $R_2$, in which targets are detected. In one embodiment, such as that shown in FIG. 7B, range bin selector 604 may select one bin for each detected peak. In other embodiments, a peak may straddle two bins or span multiple bins, and range bin selector 604 may select more than one bin for each detected peak.

FIG. 7C illustrates the operation of the Doppler FFT block 606, according to an embodiment. As shown in FIG. 6, Doppler FFT block 606 receives the output of the range bin selector 604. In other words, range spectrum data for bins associated with detected peaks in the range spectrum are forwarded to Doppler FFT block 606. For example, referring to FIG. 7B, two range FFT bins corresponding to two range estimates $R_1$ and $R_2$ may be selected by the range bin selector 604. Consequently, the range spectrum data for bins $R_1$ and $R_2$ may be forwarded to Doppler FFT block 606. Following the same example as discussed previously, 7 range spectrums all exhibit the same peaks and corresponding bins $R_1$ and $R_2$. Thus, the range spectrum data for bins $R_1$ and $R_2$ for all seven range spectrums are forwarded.

Doppler FFT block 606 performs an FFT operation along the "velocity" axis, which transforms each column of range spectrum data to a frequency domain representation. The Doppler FFT operates based on observation that a small displacement in the position of a target produces a corresponding change in the phase of the IF signal. Because consecutive chirps are separated in time (i.e., by the chirp period), the range spectrum generated from consecutive chirps reflected from the target exhibit essentially the same frequency, but different phases. For example, the seven range spectrum peaks at range bin $R_1$ all have the same magnitude but different phases. The rate at which this phase changes over the seven chirps indicates the velocity of the target(s) present at distance $R_1$. Doppler FFT block 606 thus performs a "Doppler FFT" along the column of range spectrum data for bin $R_1$, to reveal the changes in the phase of the IF signal. The result of each Doppler FFT may be referred to as a "Doppler spectrum." The same operation is performed on range spectrum data for bin $R_2$. In this example, two Doppler FFTs are performed to generate two Doppler spectrums, one at $R_1$ and one at $R_2$. After the Doppler FFT is performed, positions along each column no longer correspond to chirp indices but instead correspond to Doppler frequency bins. Each Doppler frequency bin corresponds to a velocity.

Doppler bin selector 608 evaluates each Doppler spectrum to detect any peaks that may be present. Again, there may be different ways to detect peaks. In some embodiments, Doppler bin selector 608 may be implemented as a constant false alarm rate (CFAR) detector, e.g., a cell-averaging CFAR (CA-CFAR) detector, described previously. Once Doppler bin selector 608 determines which bins are selected as containing peaks, the identity of the selected Doppler bins may be outputted. A detected peak in a Doppler spectrum indicates a velocity of one or more targets that may be present. Thus, each peak may yield a velocity estimate. As shown in FIG. 7C, the present example yields two Doppler bins, $V_1$ and $V_2$, in which targets are detected at range $R_1$. The example also yields three Doppler bins, $V_3$, $V_4$, and $V_5$, in which targets are detected at range $R_2$. This indicates there may be at least two targets at distance $R_1$, one traveling at velocity $V_1$, one traveling at velocity $V_2$. Also, there may be at least three targets at distance $R_2$, one travelling at velocity $V_3$, one traveling at velocity $V_4$, and one traveling at velocity $V_5$. In one embodiment, such as that shown in FIG. 7C, Doppler bin selector 608 may select one bin for each detected peak. In other embodiments, a peak may straddle two bins or span multiple bins, and Doppler bin selector 608 may select more than one bin for each detected peak.

Figure 7D:
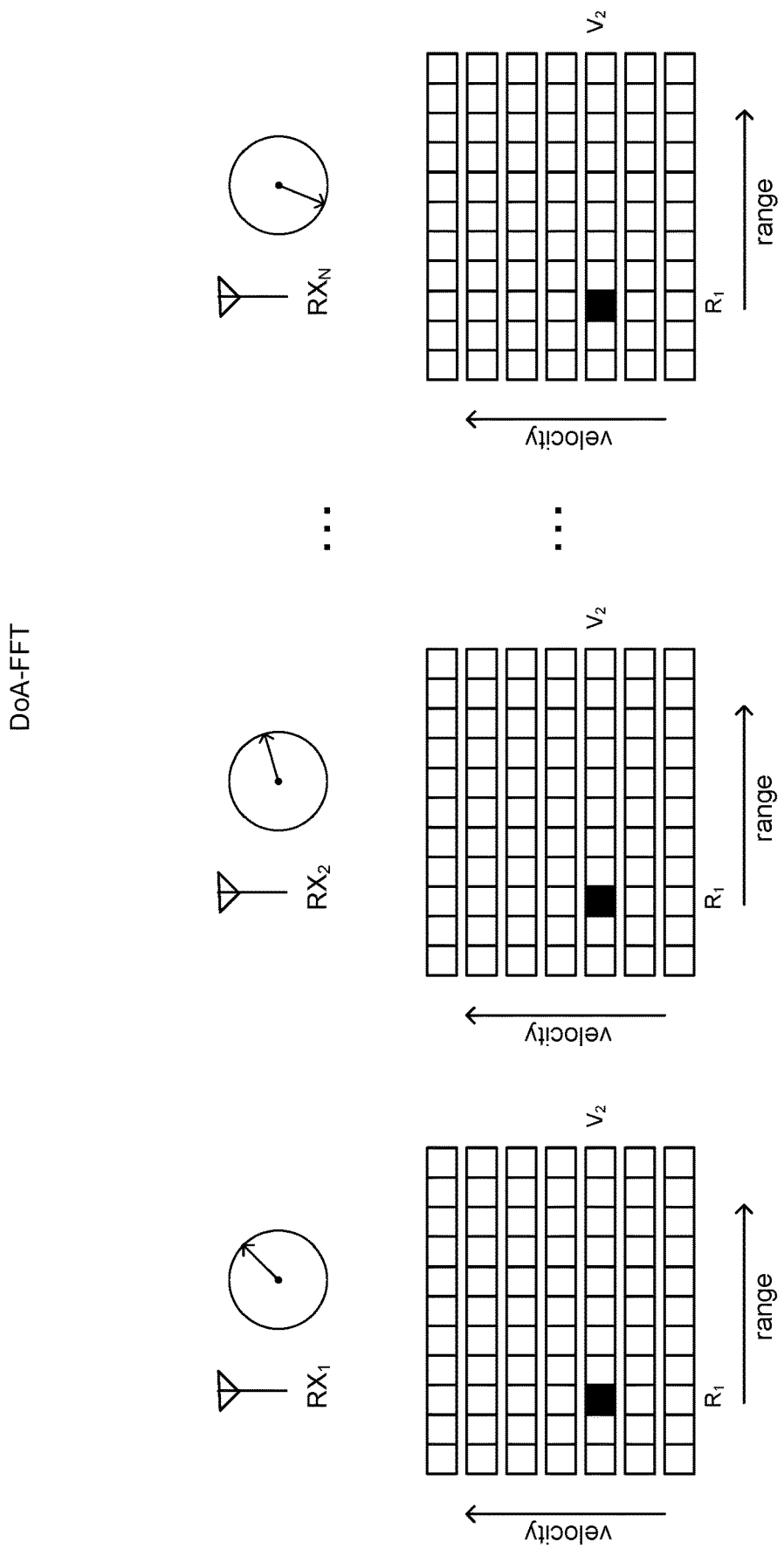
FIG. 7D illustrates the operation of DoA FFT block 610, according to an embodiment.

FIG. 7D illustrates the operation of DoA FFT block 610, according to an embodiment. As shown in FIG. 6, DoA FFT block 610 receives the output of the Doppler bin selector 608. In other words, spectrum data associated with detected peaks in the range/Doppler spectrum are forwarded to DoA FFT block 610. For example, referring to FIG. 7C, five range/Doppler bins may be detected—i.e., bins at $(V_1, R_1)$, $(V_2, R_1)$, $(V_3, R_2)$, $(V_4, R_2)$, and $(V_5, R_2)$. Spectrum data for these range/Doppler bins may be forwarded to DoA FFT block 610.

DoA estimates are premised on fact that a RADAR signal coming at an angle toward an array of antennas travels over slightly different distances to each antenna. This results in a phase difference that may be used to calculate the direction of arrival (DoA) angle. Thus, the same operations described in FIGS. 7A through 7C may be repeated for each antenna in an array of antennas. That is, for N antennas, there may be N RADAR RX signals, one from each antenna. Each RADAR RX signal may be mixed with the local RADAR TX signal, filtered using a low pass filter, and sampled using a ADC, such as shown in FIG. 1. N digitized IF signals are thus generated, one for each antenna. Each digitized IF signal is processed using a range FFT, range bin selector, Doppler FFT, and Doppler bin selector described above. N sets of range/Doppler bins may thus be generated. In the present example, each set of range/Doppler bins comprises $(V_1, R_1)$, $(V_2, R_1)$, $(V_3, R_2)$, $(V_4, R_2)$, and $(V_5, R_2)$, as shown in FIG. 7C. The N sets of range/Doppler bins may be "stacked" to form a 3-dimensional array.

For ease of illustration, FIG. 7D shows the stacked structure for one particular Doppler bin, (V2, R1). A first layer of the 3-dimensional structure comprises the (V2, R1) range/Doppler bin computed from the IF signal generated from the signal received at the first antenna. A second layer of the 3-dimensional structure comprises the (V2, R1) range/Doppler bin computed from the IF signal generated from the signal received at the second antenna. Additional layers are added for additional antennas, until the Nth layer is added, which comprises the (V2, R1) range/Doppler bin computed from the IF signal generated from the signal received at the $N^{th}$ antenna. In practice, each layer would comprise all the selected range/Doppler bins detected for the layer, e.g., bins $(V_1, R_1)$, $(V_2, R_1)$, $(V_3, R_2)$, $(V_4, R_2)$, and $(V_5, R_2)$ in the present example.

DoA FFT block 610 performs an FFT operation along the "DoA" axis, which transforms each selected range/Doppler bin, across the layers of the 3-dimensional data structure. This FFT operation reveals the change in phase of the IF signal across different antennas. The change in phase corresponds to the angle of arrival of the RADAR RX signal. Thus, DoA FFT block 610 performs a "DoA FFT" across the signals generated from the different antennas, to produce a "DoA spectrum." Such a DoA spectrum may be generated for each of the selected range/Doppler bins, e.g., bins $(V_1, R_1)$, $(V_2, R_1)$, $(V_3, R_2)$, $(V_4, R_2)$, and $(V_5, R_2)$ in the present example.

DoA bin selector 612 evaluates each DoA spectrum to detect any peaks that may be present. Once again, there may be different ways to detect peaks. In some embodiments, DoA bin selector 612 may be implemented as a constant false alarm rate (CFAR) detector, e.g., a cell-averaging CFAR (CA-CFAR) detector, described previously. Once DoA bin selector 612 determines which bins are selected as containing peaks, the identity of the selected DoA bins may be outputted. A detected peak in a DoA spectrum indicates an angle of arrival of one or more targets that may be present. Thus, each peak may yield an DoA estimate. In this manner, peaks detected in the DoA spectrum can reveal the direction of arrival of one or more targets for any given range and Doppler estimate. Returning to the example shown in FIG. 7D, there may be one or more targets detected at range $R_1$ and traveling at velocity $V_2$. For instance, if two peaks are detected in the DoA spectrum generated for the range/Doppler bin $(V_2, R_1)$, this may indicate that two different targets are both at distance R1 and traveling at velocity V2, with one target located in a direction of arrival $DoA_1$, and the other target located in a direction of arrival $DoA_2$. $DoA_1$ would correspond to the DoA bin of the first peak, and $DoA_2$ would correspond to the DoA bin of the second peak. In one embodiment, such as that shown in FIG. 7D, DoA bin selector 612 may select one bin for each detected peak. In other embodiments, a peak may straddle two bins or span multiple bins, and DoA bin selector 612 may select more than one bin for each detected peak.

Accordingly, FIG. 6 presents an example by which the IF signal may be processed to perform a range FFT, Doppler FFT, and DoA FFT to generate a three-dimensional (3D) array of spectrum values, also referred to as a RADAR 3D image. The RADAR 3D image may be used to produce range, velocity, and direction-of-arrival estimates for targets of the RADAR system. FIG. 6 shows one embodiment in which the FFTs are performed in a particular order, i.e., range FFT, followed by Doppler FFT, followed by DoA FFT.

In other embodiment, the order of the FFTs may be changed and still yield similar results. A range, Doppler, and DoA estimator 614 may translate the selected range spectrum bin(s) to actual range estimates. Range, Doppler, and DoA estimator 614 may translate the selected Doppler spectrum bins(s) to actual velocity estimates. Also, Range, Doppler, and DoA estimator 614 may translate the selected DoA spectrum bin(s) to actual direction-of-arrival angle estimates.

Range-Dependent Maximum Threshold

FIGS. 8A-8D present various embodiments of techniques for reducing false alarms in RADAR processing. The techniques generally include a step for obtaining a digital signal resulting from mixing (1) a received signal associated with reflection of a RADAR transmit signal and (2) a local version of the RADAR transmit signal, as described previously. The techniques may further include a step for performing one or more transforms using the digital signal to generate an array of spectrum values for a first domain spanning at least one of a range axis, a direction of arrival (DoA) axis, or a velocity axis. The techniques may further include a step for excluding, or obtaining one or more reduced-magnitude values for, the one or more spectrum values identified as exceeding the range-dependent maximum threshold, to generate an array of modified spectrum values for the first domain spanning the at least one of the range axis, the DoA axis, or the velocity axis. Finally, the techniques may include using the array of modified spectrum values to generate a range estimate, a DoA estimate, or a velocity estimate, or any combination thereof.

Figure 8A:
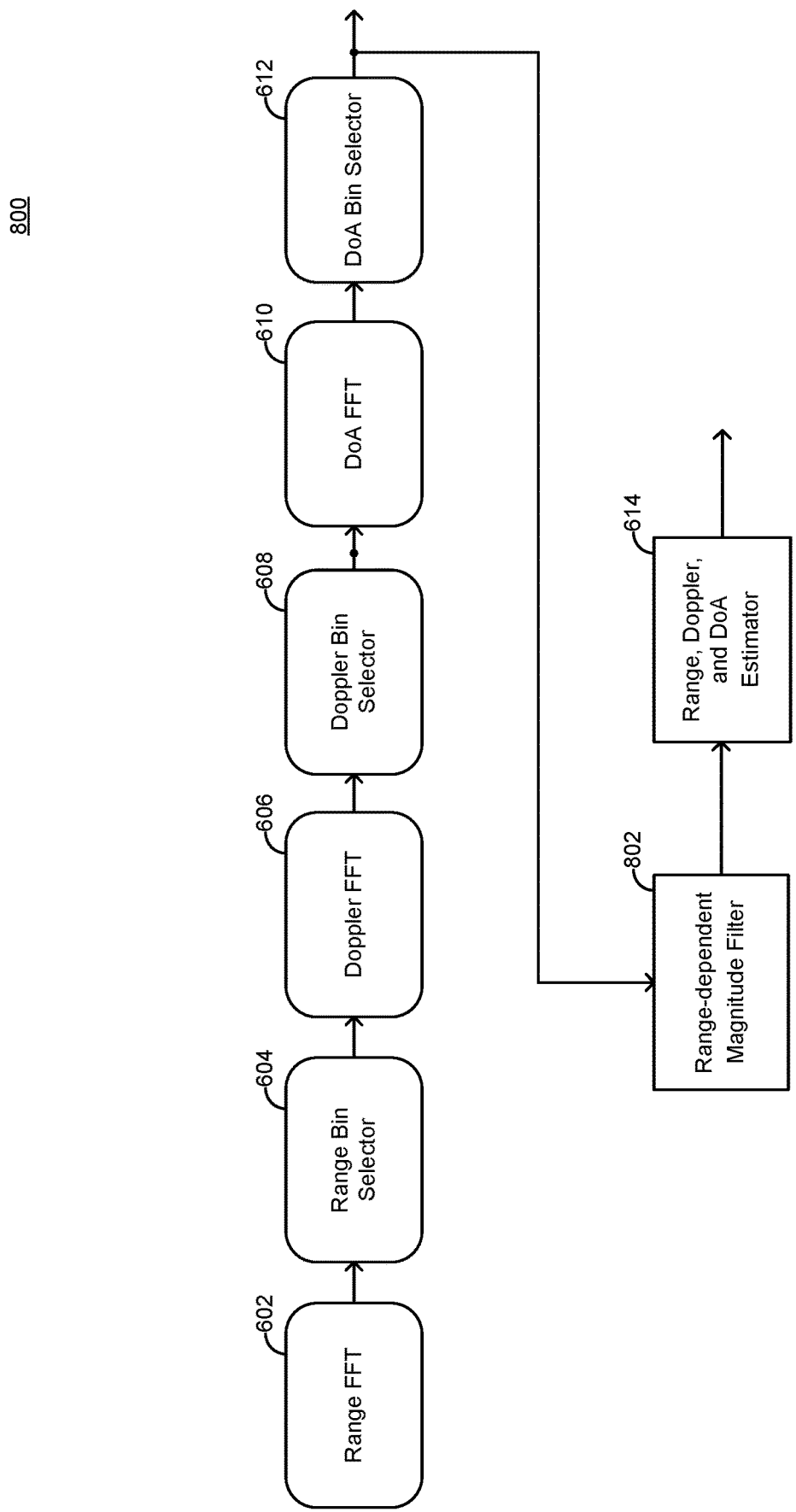
FIG. 8A is a block diagram of a RADAR data processing chain 800 that reduces false alarms by applying a range-dependent maximum threshold to an entire 3D RADAR image, according to an embodiment of the disclosure.

FIG. 8A is a block diagram of a RADAR data processing chain 800 that reduces false alarms by applying a range-dependent maximum threshold to an entire 3D RADAR image, according to an embodiment of the disclosure. As shown, RADAR data processing chain 800 comprises the same FFT blocks and bin selectors presented in FIG. 6, including range Fast Fourier Transform (FFT) block 602, range bin selector 604, Doppler FFT block 606, Doppler bin selector 608, direction-of-arrival (DoA) FFT block 610, DoA bin selector 612, and range, Doppler, and DoA estimator 614. RADAR data processing chain 800 may generate a RADAR 3D image as discussed previously. For example, the output of the DoA bin selector 612 may be an array of spectrum values comprising a three-dimensional array. The array of spectrum values is for a first domain spanning the range axis, the DoA axis, and the velocity axis.

A range-dependent magnitude filter 802 receives the RADAR 3D image and filters the RADAR 3D image based on magnitude. Range-dependent magnitude filter 802 determines a maximum threshold, or "upper bound." In one embodiment, the upper bound is a function of the estimated range R and DoA angle θ. An example of such an upper bound may be expressed as:

$$UB(R,\theta) = P_{tx} + G_{tx}(\theta) + G_{rx}(\theta) + RCS_{max} - 30 \log_{10}(4\pi) - 40 \log_{10} R + \text{processing gain} + \text{margin} \quad \text{(Eq. 4)}$$

Here, $P_{tx}$ represents the strength of the RADAR transmit signal and may be expressed in unites of decibel-milliwatts (dBm). $G_{tx}$, which represents the transmit gain, may be a function of the DoA angle θ and may be expressed in units of decibels (dB). $G_{rx}$, which represents the receive gain, may also be a function of the DoA angle θ and be expressed in units of dB. $RCS_{max}$ represents the maximum RADAR cross section expected for any target to be detected and may be expressed in units of dB. RADAR cross section (RCS) is a measure of the detectability of a target and may depend on factors such as the material of the target, the size of the target, the incident and reflected angle of RADAR beams hitting/reflecting off the target, etc. R is the estimated range of the target. The component "$-40 \log_{10} R$," expressed in dB, is the logarithmic form of a quartic function of the range estimate R. By including the component $-40 \log_{10} R$, the upper bound U(R, θ) ensures that spectrum values remain within a reasonable bound in view of the expected receive signal strength for reflected signals, which experience signal decay proportional to the distance to the fourth power (i.e., $R^4$ decay) as discussed previously. Here, R raised to the fourth power, i.e., $R^4$, is an example of a quartic function of R. Processing gain refers to any additional gain realized in processing the received signal, including any scaling applied and may be expressed in units of dB. Margin refers to an additional amount of buffer applied to further increase the upper bound U(R, θ), to suppress the probability of a real target exceeding the upper bound to nearly zero, and may also be expressed in units of dB.

As shown in FIG. 8A, range-dependent magnitude filter 802 performs magnitude filtering on the entire RADAR 3D image. Thus, every range/Doppler/DoA bin is filtered using the upper bound U(R, θ). Every range/Doppler/DoA bin that exceeds the upper bound U(R, θ) may be excluded (e.g., set to 0) or replaced with a reduced-magnitude value. For example, the reduced-magnitude value may be a signal level associated with the noise floor, an average signal level of the bins in which no peak is detected, etc. The result is a modified RADAR 3D image, or three-dimensional array of spectrum values, in which bins that do not exceed the upper bound U(R, θ) are left as they are, and bins that exceed the upper bound U(R, θ) are excluded (e.g., set to 0) or replaced with reduced-magnitude values. Range-dependent magnitude filter 802 outputs the modified RADAR 3D image. Range, Doppler, and DoA estimator 614 then uses the modified RADAR 3D image to generate the range, velocity, and DoA angle estimates. Because spectrum bins having values that exceed the upper bound U(R, θ) have been excluded (e.g., set to 0) or otherwise replaced with reduced-magnitude values, false alarm detection may be greatly reduced. In particular, false alarm detection associated with a RADAR signal transmitted along a direct path from an interferer, e.g., interferer 124 in FIG. 1, which experiences signal decay proportional to the distance to the second power (i.e., $R^2$ decay), may be effectively eliminated.

Figure 8B:
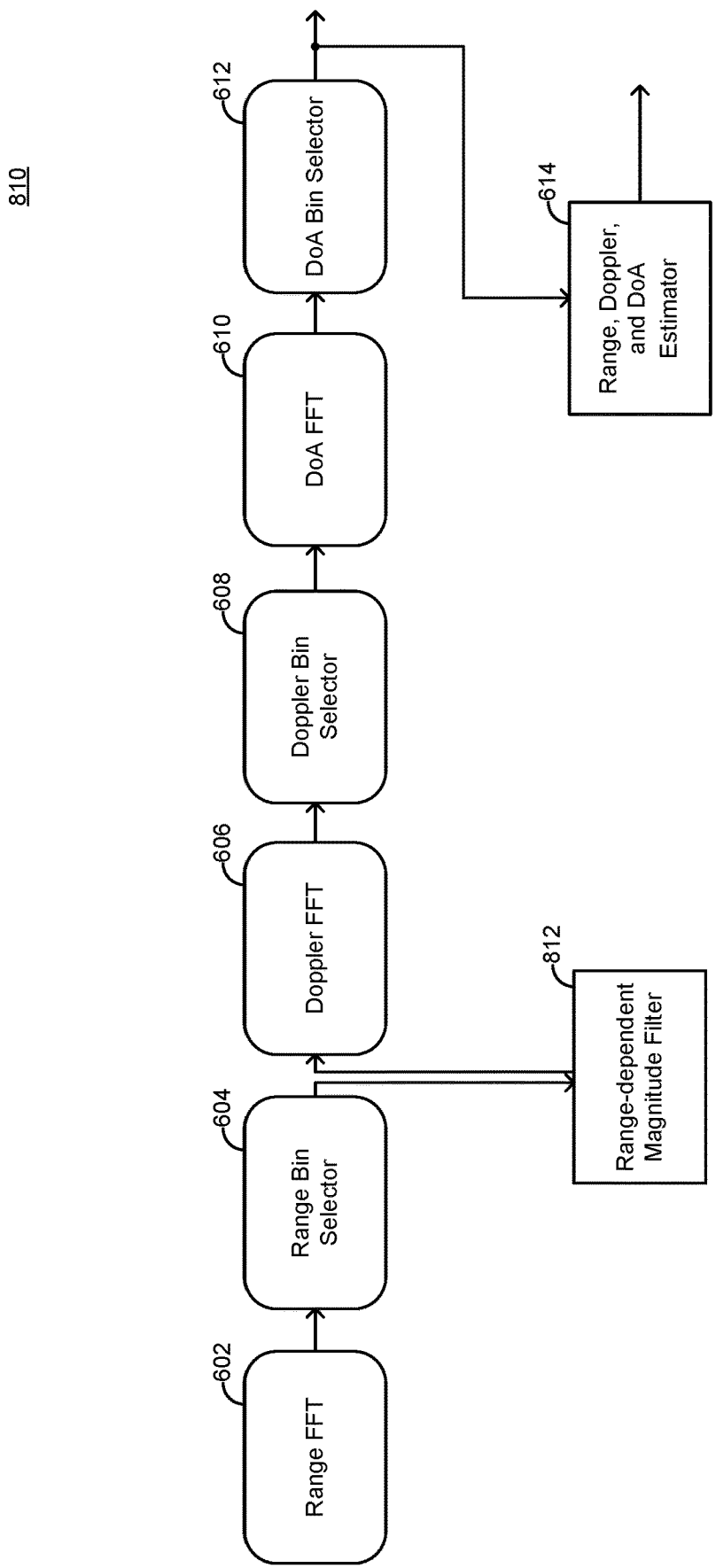
FIG. 8B is a block diagram of a RADAR data processing chain 810 that reduces false alarms by applying a range-dependent maximum threshold to a range spectrum, according to an embodiment of the disclosure.

FIG. 8B is a block diagram of a RADAR data processing chain 810 that reduces false alarms by applying a range-dependent maximum threshold to a range spectrum, according to an embodiment of the disclosure. RADAR data processing chain 810 may comprise similar FFT blocks and bin selectors as presented in FIG. 6, including range Fast Fourier Transform (FFT) block 602, range bin selector 604, Doppler FFT block 606, Doppler bin selector 608, direction-of-arrival (DoA) FFT block 610, DoA bin selector 612, and range, Doppler, and DoA estimator 614.

A range-dependent magnitude filter 812 receives the range spectrum generated from the range FFT. In one embodiment, the range spectrum may comprise the range spectrum bins selected by the range bin selector 604. The range spectrum may be an array of spectrum values comprising a one-dimensional array. The array of spectrum values is for a first domain spanning the range axis. Range-dependent magnitude filter 812 determines a maximum threshold, or upper bound, which may be a function of the estimated range R. An example of such an upper bound may be expressed as:

$$UB(R) = P_{tx} + G_{tx}(0) + G_{rx}(0) + RCS_{max} - 30 \log_{10}(4\pi) - 40 \log_{10} R + \text{processing gain} + \text{margin} \quad \text{(Eq. 5)}$$

Certain components of the upper bound, such as the transmit signal strength $P_{tx}$, maximum RADAR cross section $RCS_{max}$, "−40 $\log_{10}$ R" component, processing gain, and margin are similar to those described previously with respect to Eq. 4. However, in Eq. 5, the transmit gain $G_{tx}$ and receive gain $G_{rx}$ are not functions of the DoA angle, which has not yet been determined by RADAR data processing chain 810. That is, the transmit gain $G_{tx}$ component and the receive gain $G_{rx}$ component are both independent of any DoA estimate. In one embodiment, the transmit gain used may be $G_{tx}(0)$, which represents the maximum transmit gain for all DoA angles. Similarly, the receive gain used may be $G_{rx}(0)$, which represents the maximum receive gain for all DoA angles.

Range-dependent magnitude filter 812 performs magnitude filtering on the range spectrum. For example, every range bin that exceeds the upper bound U(R) expressed in Eq. 5 may be excluded (e.g., set to 0) or replaced with a reduced-magnitude value. The result is a modified range spectrum, which is outputted by range-dependent magnitude filter 812. RADAR data processing chain 810 then uses the modified range spectrum in subsequent steps performed by Doppler FFT 606, Doppler bin selector 608, DoA FFT 610, and DoA bin selector 612, to generate a modified RADAR 3D image. Finally, range, Doppler, and DoA estimator 614 uses the modified RADAR 3D image to generate the range, velocity, and DoA angle estimates. The present embodiment demonstrates that magnitude filtering may be applied to only the range spectrum, at an earlier stage of RADAR data processing. Once again, false alarm detection associated with a RADAR signal transmitted along a direct path from an interferer, which experiences signal decay proportional to the distance to the second power (i.e., $R^2$ decay), may be effectively eliminated.

Figure 8C:
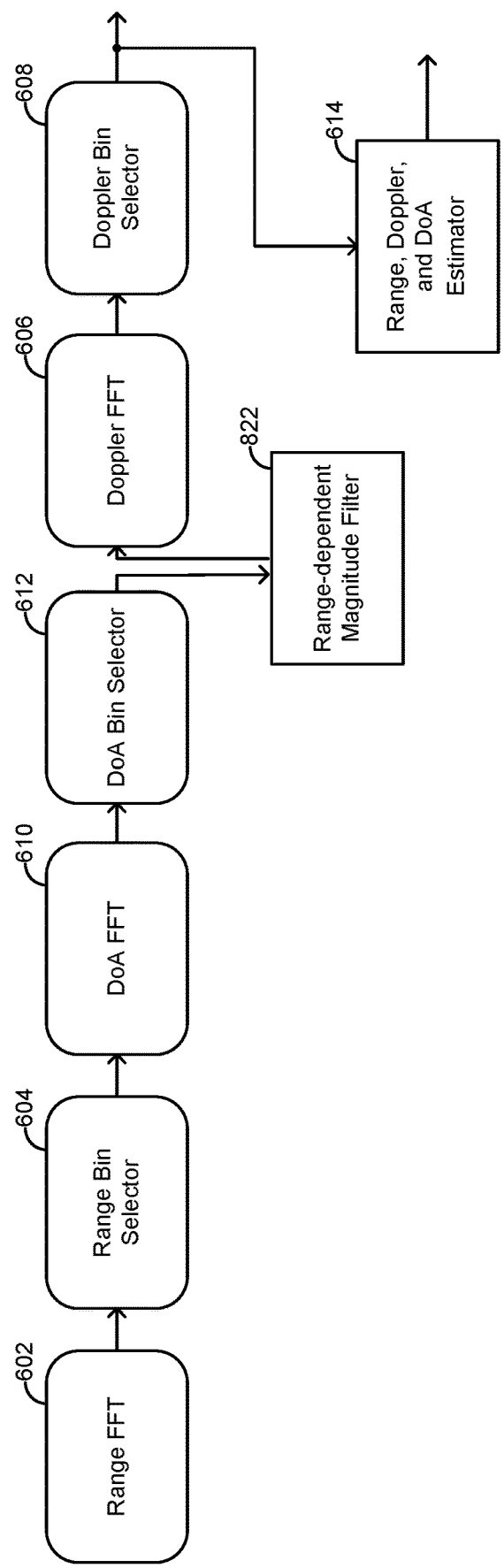
FIG. 8C is a block diagram of a RADAR data processing chain 820 that reduces false alarms by applying a range-dependent maximum threshold to a range/DoA spectrum, according to an embodiment of the disclosure.

FIG. 8C is a block diagram of a RADAR data processing chain 820 that reduces false alarms by applying a range-dependent maximum threshold to a range/DoA spectrum, according to an embodiment of the disclosure. RADAR data processing chain 820 may comprise similar FFT blocks and bin selectors as presented in FIG. 6, including range Fast Fourier Transform (FFT) block 602, range bin selector 604, Doppler FFT block 606, Doppler bin selector 608, direction-of-arrival (DoA) FFT block 610, DoA bin selector 612, and range, Doppler, and DoA estimator 614. However, in FIG. 8C, the order in which the FFTs are perform is changed. Here, the range FFT is performed first, followed by the DoA FFT, then followed by the Doppler FFT.

A range-dependent magnitude filter 822 receives the range/DoA spectrum generated from the range FFT and DoA FFT. In one embodiment, the range spectrum may comprise the range spectrum bins selected by the range bin selector 604 and DoA spectrum bins selected by the DoA bin selector 612. The range/DoA spectrum may be an array of spectrum values comprising a two-dimensional array. The array of spectrum values is for a first domain spanning the range axis and the DoA axis. Range-dependent magnitude filter 822 determines a maximum threshold, or upper bound, which may be a function of the estimated range R and estimated DoA angle θ. An example of such an upper bound may be expressed as:

$$UB(R,\theta)=P_{tx}+G_{tx}(\theta)+G_{rx}(\theta)+RCS_{max}-30\ \log_{10}(4\pi)- 40\ \log_{10}R+\text{processing gain}+\text{margin} \quad \text{(Eq. 6)}$$

Components of the upper bound, such as the transmit signal strength $P_{tx}$, the transmit gain $G_{tx}(\theta)$, receive gain $G_{rx}(\theta)$, maximum RADAR cross section $RCS_{max}$, "−40 $\log_{10}$ R" component, processing gain, and margin are similar to those described previously with respect to Eq. 4. Here, the transmit gain $G_{tx}(\theta)$ component and the receive gain $G_{rx}(\theta)$ component are both based on the DoA estimate.

Range-dependent magnitude filter 822 performs magnitude filtering on the range/DoA spectrum. For example, every range/DoA bin that exceeds the upper bound U(R, θ) expressed in Eq. 6 may be excluded (e.g., set to 0) or replaced with a reduced-magnitude value. The result is a modified range/DoA spectrum, which is outputted by range-dependent magnitude filter 822. RADAR data processing chain 822 then uses the modified range/DoA spectrum in subsequent steps performed by Doppler FFT 606 and Doppler bin selector 608, to generate a modified RADAR 3D image. Finally, range, Doppler, and DoA estimator 614 uses the modified RADAR 3D image to generate the range, velocity, and DoA angle estimates. The present embodiment demonstrates that magnitude filtering may be applied to the range/DoA spectrum, at an intermediate stage of RADAR data processing. Once again, false alarm detection associated with a RADAR signal transmitted along a direct path from an interferer, which experiences signal decay proportional to the distance to the second power (i.e., $R^2$ decay), may be effectively eliminated.

Figure 8D:
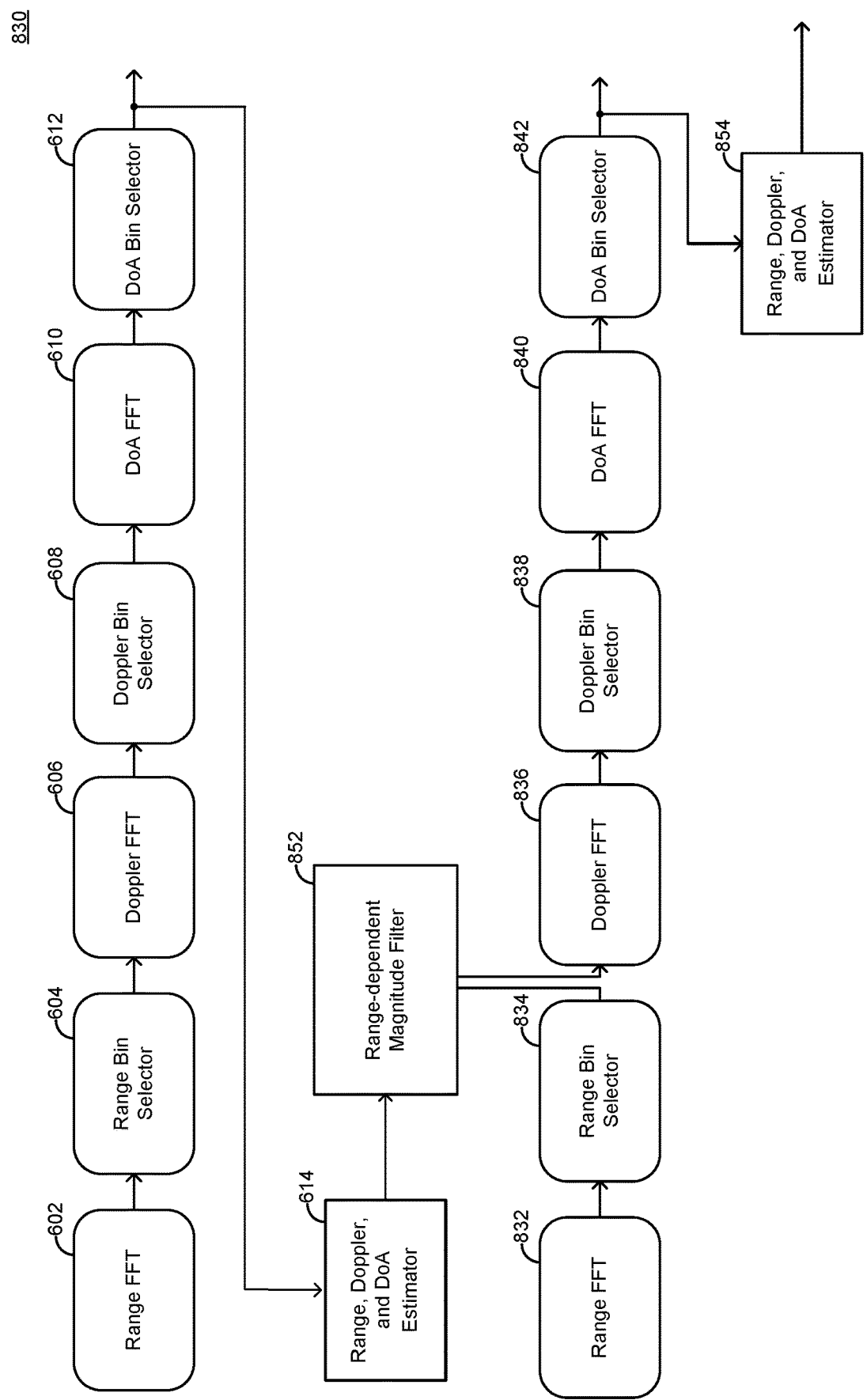
FIG. 8D is a block diagram of a RADAR data processing chain 830 that reduces false alarms by first obtaining range and DoA angle estimates, then using the range and DoA angle estimates to inform application of a range-dependent maximum threshold to a range spectrum, according to an embodiment of the disclosure.

FIG. 8D is a block diagram of a RADAR data processing chain 830 that reduces false alarms by first obtaining range and DoA angle estimates, then using the range and DoA angle estimates to inform application of a range-dependent maximum threshold to a range spectrum, according to an embodiment of the disclosure. RADAR data processing chain 810 may comprise similar FFT blocks and bin selectors as presented in FIG. 6, including range Fast Fourier Transform (FFT) block 602, range bin selector 604, Doppler FFT block 606, Doppler bin selector 608, direction-of-arrival (DoA) FFT block 610, DoA bin selector 612, and range, Doppler, and DoA estimator 614.

In an initial step, RADAR data processing chain 830 may use range, Doppler, and DoA estimator 614 to generate range, velocity, and DoA angle estimates in a conventional manner—i.e., without any filtering of spectrum values based on a range-dependent maximum threshold. Thus, a RADAR three-dimensional image is generated. Based on this RADAR three-dimensional image, one or more targets are detected. In particular, the range and DoA estimates (i.e., range, DoA) of targets detected using RADAR data processing chain 830 may be stored for subsequent use. That is, a range estimate and a DoA estimate is stored for each of the one or more detected targets.

In a secondary step, RADAR data processing chain 830 may apply a range-dependent maximum threshold to a range spectrum, in a manner similar to that described above with respect to FIG. 8B. As shown in FIG. 8D, this may be done using a second set of filters and bin selectors comprising a range Fast Fourier Transform (FFT) block 832, a range bin selector 834, a Doppler FFT block 836, a Doppler bin selector 838, a direction-of-arrival (DoA) FFT block 840, and a DoA bin selector 842. Specifically, a new range FFT is performed on the digitized IF signal using range FFT 832, and range FFT bins are selected using range bin selector 834.

A range-dependent magnitude filter 852 receives the range spectrum generated from the range FFT. Thus, for each of the one or more spectrum values of the range spectrum, the spectrum value corresponds to a range estimate associated with at least one of the detected targets. In one embodiment, the range spectrum may comprise the range spectrum bins selected by the range bin selector 834. Range-dependent magnitude filter 852 determines a maximum threshold, or upper bound, which may be a function of the estimated range R. An example of such an upper bound may be expressed as:

$$UB(R)=P_{tx}+G_{tx,max}+G_{rx,max}+RCS_{max}-30\log_{10}(4\pi)-40\log_{10}R+\text{processing gain}+\text{margin} \quad (Eq. 7)$$

Once again, certain components of the upper bound, such as the transmit signal strength $P_{tx}$, maximum RADAR cross section $RCS_{max}$, "$-40\log_{10}R$" component, processing gain, and margin are similar to those described previously with respect to Eq. 4. However, in Eq. 7, the transmit gain $G_{tx,max}$ may be a maximum TX gain component selected from one or more TX gain components based on the one or more of the stored DoA estimates associated with the one or more of the detected targets located at the range estimate. For example, the maximum TX gain $G_{tx,max}$ component may be the maximum transmit gain at all DoA angles corresponding to the range R where targets were detected in the initial step—e.g., based on DoA angle and range estimates generated by range, Doppler, and DoA estimator 614. Similarly, the receive gain $G_{rx,max}$ may correspond to a maximum RX gain component selected from one or more RX gain components based on the one or more of the stored DoA estimates associated with the one or more of the detected targets located at the range estimate. For example, the maximum receive gain $G_{rx,max}$ component may be the maximum receive gain at all DoA angles corresponding to the range R where targets were detected in the initial step.

Range-dependent magnitude filter 852 performs magnitude filtering on the regenerated range spectrum, which may be produced by range FFT 832 and range bin selector 834. For example, every range bin that exceeds the upper bound U(R) expressed in Eq. 7 may be excluded (e.g., set to 0) or replaced with a reduced-magnitude value. The result is a modified range spectrum, which is outputted by range-dependent magnitude filter 852. RADAR data processing chain 830 then uses the modified range spectrum in subsequent steps performed by Doppler FFT 836, Doppler bin selector 838, DoA FFT 840, and DoA bin selector 842, to generate a modified RADAR 3D image. Finally, range, Doppler, and DoA estimator 854 uses the modified RADAR 3D image to generate the range, velocity, and DoA angle estimates. Once again, false alarm detection associated with a RADAR signal transmitted along a direct path from an interferer, which experiences signal decay proportional to the distance to the second power (i.e., $R^2$ decay), may be effectively eliminated.

FIG. 8D shows two sets of FFT blocks and bin selectors for performing the initial step and secondary step described above, according to one embodiment of the disclosure. In an alternative embodiment, the same FFT blocks and bin selectors may be used to perform both the initial step and secondary step. In such an alternative embodiment, RADAR data processing chain 830 would include only one set of FFT blocks and bin selectors—e.g., range Fast Fourier Transform (FFT) block 602, range bin selector 604, Doppler FFT block 606, Doppler bin selector 608, direction-of-arrival (DoA) FFT block 610, DoA bin selector 612, and range, Doppler, and DoA estimator 614—which would be used the initial step and re-used in the secondary step.

Figure 9:
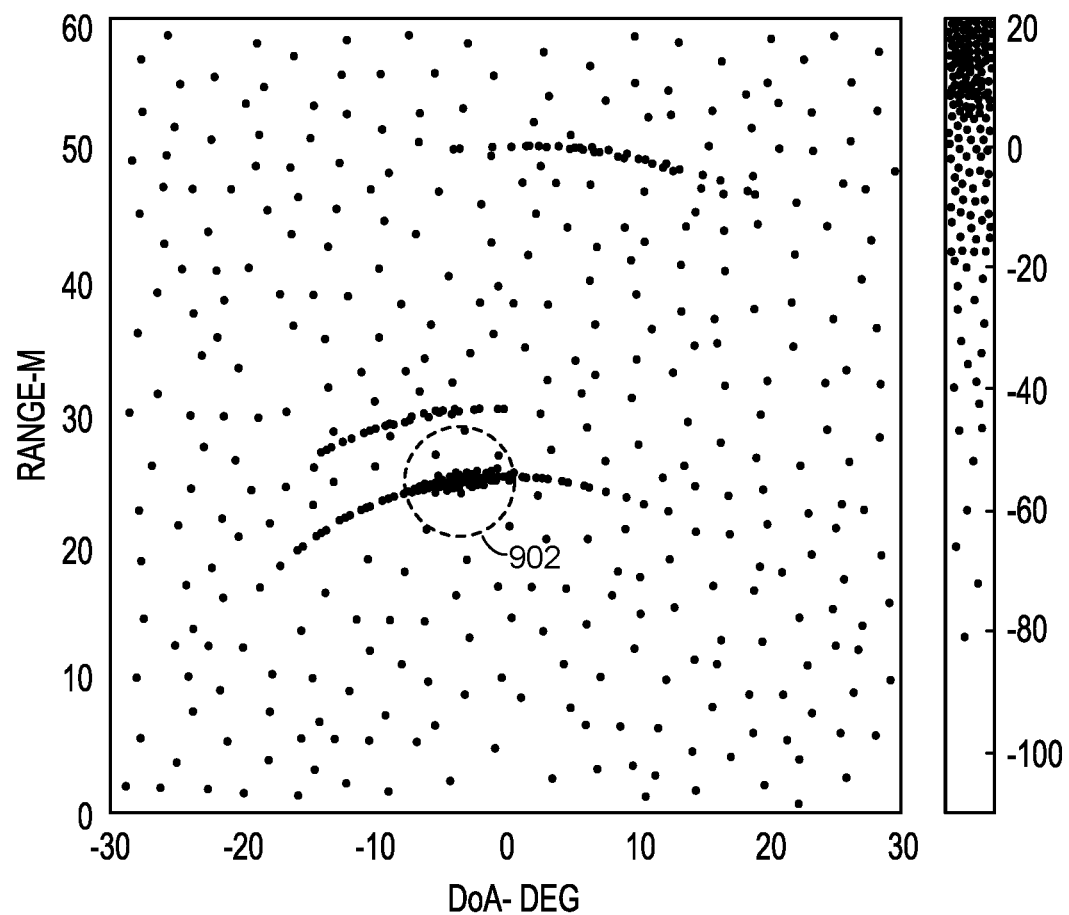
FIG. 9 is a range-and-DoA spectrum plot showing range/DoA bin values that potentially exceed a range-dependent maximum threshold.

FIG. 9 is a range-and-DoA spectrum plot showing range/DoA bin values that potentially exceed a range-dependent maximum threshold. The y-axis, expressed in units of meters (m), represents range values and correspond to range bins. The x-axis, expressed in degrees, represents direction-of-arrival angle values and correspond to DoA bins. The plot is thus a two-dimensional array comprising "cells." Each cell corresponds to a range/DoA bin and has a spectrum value. As shown in FIG. 9, a cluster 902 of unusually high spectrum values for range/DoA bins near the estimated range of approximately 25 meters and estimated DoA angle of approximately −3 degrees. These unusually high spectrum values may be associated with RADAR signals transmitted along a direct path from an active interferer, e.g., interferer 124 shown in FIG. 1. As discussed previously, range, velocity, and DoA estimates generated by the detector based on such direct-path RADAR signals may be meaningless and lead to detection of "ghost targets." The use of a range-dependent maximum threshold to filter spectrum values may significantly reduce false detections of such "ghost targets," according to various embodiments of the disclosure.

Figure 10:
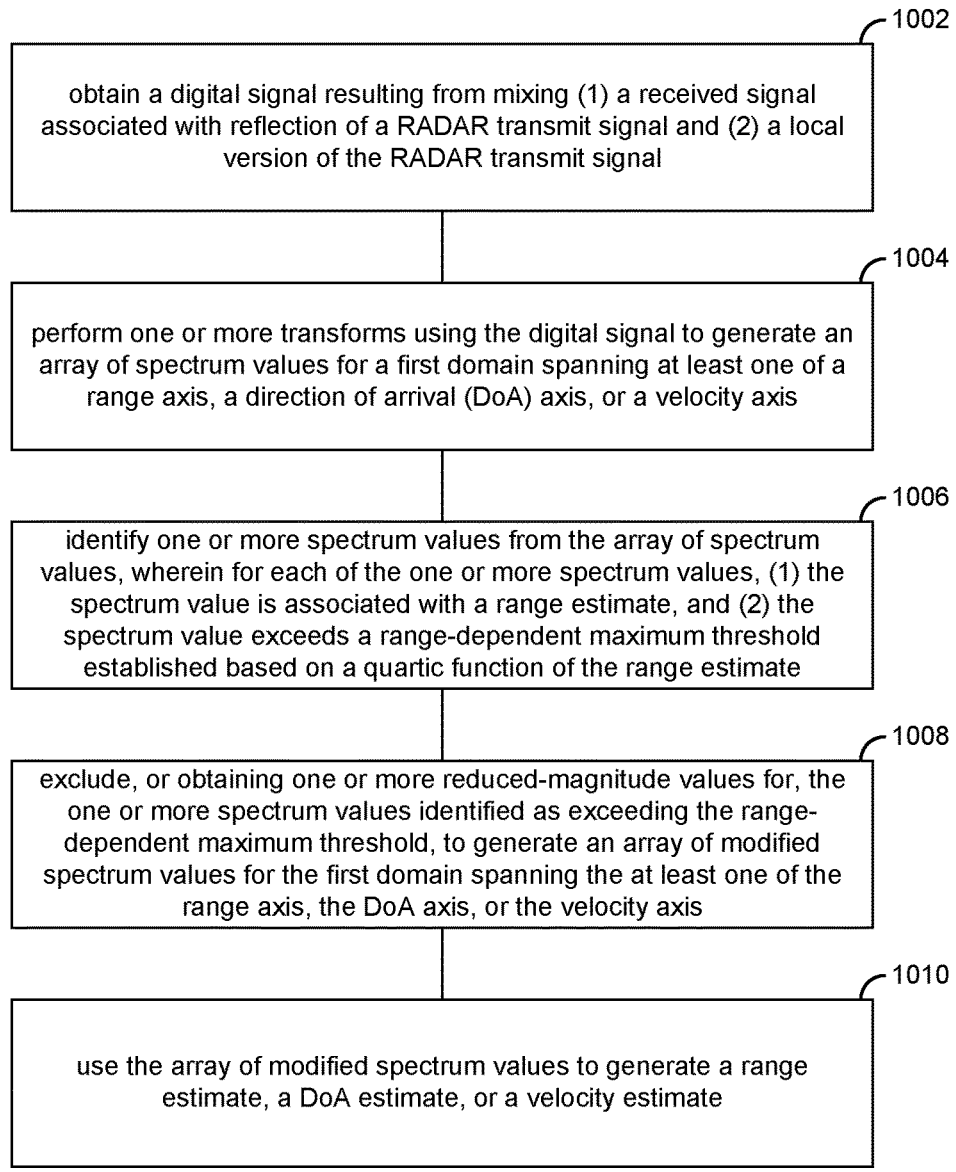
FIG. 10 is a flow diagram of a process 1000 for reducing false alarms in RADAR estimates, in accordance with an embodiment of the disclosure.

FIG. 10 is a flow diagram of a process 1000 for reducing false alarms in RADAR estimates, in accordance with an embodiment of the disclosure. In a step 1002, digital signal is obtained that results from mixing (1) a received signal associated with reflection of a RADAR transmit signal and (2) a local version of the RADAR transmit signal. In a step 1004, one or more transforms are performed using the digital signal to generate an array of spectrum values for a first domain spanning at least one of a range axis, a direction of arrival (DoA) axis, or a velocity axis. In a step 1006, one or more spectrum values are identified from the array of spectrum values, wherein for each of the one or more spectrum values, (1) the spectrum value is associated with a range estimate, and (2) the spectrum value exceeds a range-dependent maximum threshold established based on a quartic function of the range estimate. A step 1008 involves excluding, or obtaining one or more reduced-magnitude values for, the one or more spectrum values identified as exceeding the range-dependent maximum threshold, to generate an array of modified spectrum values for the first domain spanning the at least one of the range axis, the DoA axis, or the velocity axis. In a step 1010, the array of modified spectrum values is used to generate a range estimate, a DoA estimate, or a velocity estimate.

Figure 11:
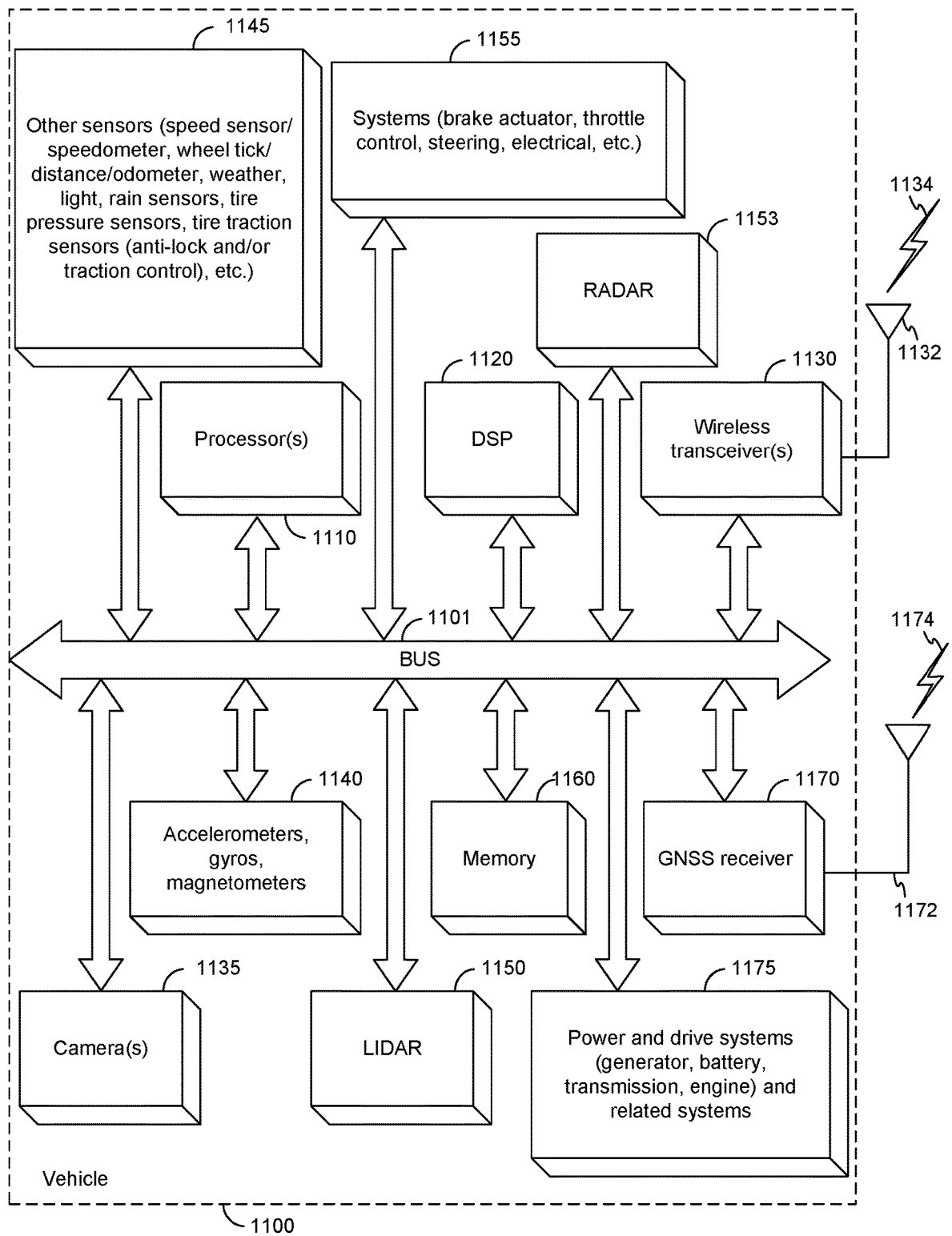
FIG. 11 is a block diagram of various hardware and software components of a vehicle 1100 which may deploy a RADAR system utilizing the false detection reduction components and techniques disclosed herein, according to an embodiment of the disclosure.

FIG. 11 is a block diagram of various hardware and software components of a vehicle 1100 which may deploy a RADAR system utilizing the false detection reduction components and techniques disclosed herein, according to an embodiment of the disclosure. Vehicle 1100 may comprise for example, a car, truck, motorcycle and/or other motorized vehicle, may transmit radio signals to, and receive radio signals from, other vehicles, for example, via V2X car to car communication, and/or from a wireless communication network, base station, and/or wireless access point, etc. In one example, vehicle 1100 may communicate, via wireless transceiver(s) 1130 and wireless antenna(s) 1132 with other vehicles and/or wireless communication networks by transmitting wireless signals to, or receiving wireless signals from a remote wireless transceiver which may comprise another vehicle, a base station (e.g., a NodeB, eNodeB, or gNodeB) or wireless access point, over a wireless communication link.

Similarly, vehicle 1100 may transmit wireless signals to, or receive wireless signals from a local transceiver over a wireless communication link, for example, by using a WLAN and/or a PAN wireless transceiver, here represented by one of wireless transceiver(s) 1130 and wireless antenna(s) 1132. In an embodiment, wireless transceiver(s) 1130 may comprise various combinations of WAN, WLAN, and/or PAN transceivers. In an embodiment, wireless transceiver(s) 1130 may also comprise a Bluetooth transceiver, a ZigBee transceiver, or other PAN transceiver. In an embodiment, vehicle 1100 may transmit wireless signals to, or receive wireless signals from a wireless transceiver 1130 on a vehicle 1100 over wireless communication link 1134. A local transceiver, a WAN wireless transceiver and/or a mobile wireless transceiver may comprise a WAN transceiver, an access point (AP), femtocell, Home Base Station, small cell base station, HNB, HeNB, or gNodeB and may provide access to a wireless local area network (WLAN, e.g., IEEE 802.11 network), a wireless personal area network (PAN, e.g., Bluetooth network) or a cellular network (e.g., an LTE network or other wireless wide area network such as those discussed in the next paragraph). Of course, it should be understood that these are merely examples of networks that may communicate with a vehicle over a wireless link, and claimed subject matter is not limited in this respect. It is also understood that wireless transceiver(s) 1130 may be located on various types of vehicles 1100, such as boats, ferries, cars, buses, drones, and various transport vehicles. In an embodiment, the vehicle 1100 may be utilized for passenger transport, package transport or other purposes. In an embodiment, GNSS signals 1174 from GNSS Satellites are utilized by vehicle 1100 for location determination and/or for the determination of GNSS signal parameters and demodulated data. In an embodiment, signals 1134 from WAN transceiver(s), WLAN and/or PAN local transceivers are used for location determination, alone or in combination with GNSS signals 1174.

Examples of network technologies that may support wireless transceivers 1130 are GSM, CDMA, WCDMA, LTE, 5G or New Radio Access Technology (NR), HRPD, and V2X car-to-car communication. As noted, V2X communication protocols may be defined in various standards such as SAE and ETS-ITS standards. GSM, WCDMA and LTE are technologies defined by 3GPP. CDMA and HRPD are technologies defined by the 3rd Generation Partnership Project II (3GPP2). WCDMA is also part of the Universal Mobile Telecommunications System (UMTS) and may be supported by an HNB.

Wireless transceivers 1130 may communicate with communications networks via WAN wireless base stations which may comprise deployments of equipment providing subscriber access to a wireless telecommunication network for a service (e.g., under a service contract). Here, a WAN wireless base station may perform functions of a WAN or cell base station in servicing subscriber devices within a cell determined based, at least in part, on a range at which the WAN wireless base station is capable of providing access service. Examples of WAN base stations include GSM, WCDMA, LTE, CDMA, HRPD, Wi-Fi, Bluetooth, WiMAX, 5G NR base stations. In an embodiment, further wireless base stations may comprise a WLAN and/or PAN transceiver.

In an embodiment, vehicle 1100 may contain one or more cameras 1135. In an embodiment, the camera may comprise a camera sensor and mounting assembly. Different mounting assemblies may be used for different cameras on vehicle 1100. For example, front facing cameras may be mounted in the front bumper, in the stem of the rear-view mirror assembly or in other front facing areas of the vehicle 1100. Rear facing cameras may be mounted in the rear bumper/fender, on the rear windshield, on the trunk or other rear facing areas of the vehicle. The side facing mirrors may be mounted on the side of the vehicle such as being integrated into the mirror assembly or door assemblies. The cameras may provide object detection and distance estimation, particularly for objects of known size and/or shape (e.g., a stop sign and a license plate both have standardized size and shape) and may also provide information regarding rotational motion relative to the axis of the vehicle such as during a turn. When used in concert with the other sensors, the cameras may both be calibrated through the use of other systems such as through the use of LIDAR, wheel tick/distance sensors, and/or GNSS to verify distance traveled and angular orientation. The cameras may similarly be used to verify and calibrate the other systems to verify that distance measurements are correct, for example by calibrating against known distances between known objects (landmarks, roadside markers, road mile markers, etc.) and also to verify that object detection is performed accurately such that objects are accordingly mapped to the correct locations relative to the car by LIDAR and other system. Similarly, when combined with, for example, accelerometers, impact time with road hazards, may be estimated (elapsed time before hitting a pot hole for example) which may be verified against actual time of impact and/or verified against stopping models (for example, compared against the estimated stopping distance if attempting to stop before hitting an object) and/or maneuvering models (verifying whether current estimates for turning radius at current speed and/or a measure of maneuverability at current speed are accurate in the current conditions and modified accordingly to update estimated parameters based on camera and other sensor measurements).

Accelerometers, gyros and magnetometers 1140, in an embodiment, may be utilized to provide and/or verify motion and directional information. Accelerometers and gyros may be utilized to monitor wheel and drive train performance. Accelerometers, in an embodiment, may also be utilized to verify actual time of impact with road hazards such as pot holes relative to predicted times based on existing stopping and acceleration models as well as steering models. Gyros and magnetometers may, in an embodiment, be utilized to measure rotational status of the vehicle as well as orientation relative to magnetic north, respectively, and to measure and calibrate estimates and/or models for turning radius at current speed and/or a measure of maneuverability at current speed, particularly when used in concert with measurements from other external and internal sensors such as other sensors 1145 such as speed sensors, wheel tick sensors, and/or odometer measurements.

LIDAR 1150 uses pulsed laser light to measure ranges to objects. While cameras may be used for object detection, LIDAR 1150 provides a means, to detect the distances (and orientations) of the objects with more certainty, especially in regard to objects of unknown size and shape. LIDAR 1150 measurements may also be used to estimate rate of travel, vector directions, relative position and stopping distance by providing accurate distance measurements and delta distance measurements.

Processor 1110 and/or digital signal processor (DSP) 1120 may carryout programmed instructions to perform various tasks, including tasks related to RADAR data processing. Thus, an processor 1110 and/or DSP 112 may implement, for example, processor 114 shown in FIG. 1. Memory 1160 may be utilized with processor 1110 and/or DSP 1120, which may comprise Random Access Memory (RAM), Read-Only Memory (ROM), disc drive, FLASH, or other memory devices or various combinations thereof. In an embodiment, memory 1160 may contain instructions to implement various methods described throughout this description including, for example, steps performed for RADAR data processing. In an embodiment, memory may contain instructions for operating and calibrating sensors, and for receiving map, weather, vehicular (both vehicle 1100 and surrounding vehicles) and other data, and utilizing various internal and external sensor measurements and received data and measurements to determine driving parameters such as relative position, absolute position, stopping distance, acceleration and turning radius at current speed and/or maneuverability at current speed, inter-car distance, turn initiation/timing and performance, and initiation/timing of driving operations.

In an embodiment, power and drive systems (generator, battery, transmission, engine) and related systems 1175 and systems (brake, actuator, throttle control, steering, and electrical) 1155 may be controlled by the processor(s) and/or hardware or software or by an operator of the vehicle or by some combination thereof. The systems (brake, actuator, throttle control, steering, electrical, etc.) 1155 and power and drive or other systems 1175 may be utilized in conjunction with performance parameters and operational parameters, to enable autonomously (and manually, relative to alerts and emergency overrides/braking/stopping) driving and operating a vehicle 1100 safely and accurately, such as to safely, effectively and efficiently merge into traffic, stop, accelerate and otherwise operate the vehicle 1100. In an embodiment, input from the various sensor systems such as camera 1135, accelerometers, gyros and magnetometers 1140, LIDAR 1150, GNSS receiver 1170, RADAR 1153, input, messaging and/or measurements from wireless transceiver(s) 1130 and/or other sensors 1145 or various combinations thereof, may be utilized by processor 1110 and/or DSP 1120 or other processing systems to control power and drive systems 1175 and systems (brake actuator, throttle control, steering, electrical, etc.) 1155.

A global navigation satellite system (GNSS) receiver 1170 may be utilized to determine position relative to the earth (absolute position) and, when used with other information such as measurements from other objects and/or mapping data, to determine position relative to other objects such as relative to other vehicles and/or relative to the road surface. To determine position, the GNSS receiver 1170, may receive RF signals 1174 from GNSS satellites. The GNSS receiver 1170 may support one or more GNSS constellations as well as other satellite-based navigation systems. For example, in an embodiment, GNSS receiver 1170 may support global navigation satellite systems such as GPS, the GLONASS, Galileo, and/or BeiDou, or any combination thereof. In an embodiment, GNSS receiver 1170 may support regional navigation satellite systems such as NavIC or QZSS or a combination thereof as well as various augmentation systems (e.g., Satellite Based Augmentation Systems (SBAS) or ground based augmentation systems (GBAS)) such as Doppler Orbitography and Radio-positioning Integrated by Satellite (DORIS) or wide area augmentation system (WAAS) or the European geostationary navigation overlay service (EGNOS) or the multi-functional satellite augmentation system (MSAS) or the local area augmentation system (LAAS). In an embodiment, GNSS receiver(s) 1130 and antenna(s) 1132 may support multiple bands and sub-bands such as GPS L1, L2 and L5 bands, Galileo E1, E5, and E6 bands, Compass (BeiDou) B1, B3 and B2 bands, GLONASS G1, G2 and G3 bands, and QZSS L1C, L2C and L5-Q bands.

The GNSS receiver 1170 may be used to determine location and relative location which may be utilized for location, navigation, and to calibrate other sensors, when appropriate, such as for determining distance between two time points in clear sky conditions and using the distance data to calibrate other sensors such as the odometer and/or LIDAR. In an embodiment, GNSS-based relative locations, based on, for example shared Doppler and/or pseudorange measurements between vehicles, may be used to determine highly accurate distances between two vehicles, and when combined with vehicle information such as shape and model information and GNSS antenna location, may be used to calibrate, validate and/or affect the confidence level associated with information from LIDAR, camera, RADAR, SONAR and other distance estimation techniques. GNSS Doppler measurements may also be utilized to determine linear motion and rotational motion of the vehicle or of the vehicle relative to another vehicle, which may be utilized in conjunction with gyro and/or magnetometer and other sensor systems to maintain calibration of those systems based upon measured location data. Relative GNSS positional data may also be combined with high confidence absolute locations from RSUs, to determine high confidence absolute locations of the vehicle. Furthermore, relative GNSS positional data may be used during inclement weather that may obscure LIDAR and/or camera-based data sources to avoid other vehicles and to stay in the lane or other allocated road area. For example, using an RSU equipped with GNSS receiver and V2X capability, GNSS measurement data may be provided to the vehicle, which, if provided with an absolute location of the RSU, may be used to navigate the vehicle relative to a map, keeping the vehicle in lane and/or on the road, in spite of lack of visibility.

RADAR 1153 may incorporate, for example, RADAR system 100 shown in FIG. 1. Generally speaking, RADAR 1153 uses transmitted radio waves that are reflected off of objects. The reflected radio waves are analyzed, based on the time taken for reflections to arrive and other signal characteristics of the reflected waves to determine properties such as range, velocity, and direction of arrival (DoA) of nearby objects. Such objects may include nearby cars, roadside objects (signs, other vehicles, pedestrians, etc.) and will generally enable detection of objects even if there is obscuring weather such as snow, rail or hail. Thus, RADAR 1153 may be used to complement LIDAR 1150 systems and camera 1135 systems in providing ranging information to other objects by providing ranging and distance measurements and information when visual-based systems typically fail. Furthermore, RADAR 1153 may be utilized to calibrate and/or sanity check other systems such as LIDAR 1150 and camera 1135. Ranging measurements from RADAR 1153 may be utilized to determine/measure stopping distance at current speed, acceleration, maneuverability at current speed and/or turning radius at current speed and/or a measure of maneuverability at current speed. In some systems, ground penetrating RADAR may also be used to track road surfaces via, for example, RADAR-reflective markers on the road surface or terrain features such as ditches.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory (e.g., memory 1160 of FIG. 11) can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. The term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

Implementation examples are described in the following numbered clauses:

Clause 1. A method for reducing false alarms in RADAR processing, the method comprising:

obtaining a digital signal resulting from mixing (1) a received signal associated with reflection of a RADAR transmit signal and (2) a local version of the RADAR transmit signal;

performing one or more transforms using the digital signal to generate an array of spectrum values for a first domain spanning at least one of a range axis, a direction of arrival (DoA) axis, or a velocity axis;

identifying one or more spectrum values from the array of spectrum values, wherein for each of the one or more spectrum values, (1) the spectrum value is associated with a range estimate, and (2) the spectrum value exceeds a range-dependent maximum threshold established based on a quartic function of the range estimate;

excluding, or obtaining one or more reduced-magnitude values for, the one or more spectrum values identified as exceeding the range-dependent maximum threshold, to generate an array of modified spectrum values for the first domain spanning the at least one of the range axis, the DoA axis, or the velocity axis; and using the array of modified spectrum values to generate a range estimate, a DoA estimate, or a velocity estimate, or any combination thereof.

Clause 2. The method of clause 1, wherein a component of the range-dependent maximum threshold, based on the quartic function of the range estimate, comprises an expression $-40*\log_{10}*R$ decibels (dB), wherein R represents the range estimate.

Clause 3. The method of clause 1, wherein the array of spectrum values comprises a three-dimensional array, and the first domain spans the range axis, the DoA axis, and the velocity axis.

Clause 4. The method of clause 3, wherein for each of the one or more spectrum values, (1) the spectrum value is further associated with a DoA estimate, and (2) the range-dependent maximum threshold is further based on the DoA estimate.

Clause 5. The method of clause 4, wherein for each of the one or more spectrum values, the range-dependent maximum threshold includes a TX gain component based on the DoA estimate and an RX gain component based on the DoA estimate.

Clause 6. The method of clause 1, wherein the array of spectrum values comprises a one-dimensional array, and the first domain spans only the range axis.

Clause 7. The method of clause 6, wherein the range-dependent maximum threshold further comprises a TX gain component independent of any DoA estimate and an RX gain component independent of any DoA estimate.

Clause 8. The method of clause 6, wherein:

the array of modified spectrum values is used to generate the range estimate, and the method further comprises performing a Doppler transform and a DoA transform based on the array of modified spectrum values, to generate the DoA estimate and the velocity estimate.

Clause 9. The method of clause 1, wherein the array of spectrum values comprises a two-dimensional array, and the first domain spans the range axis and the DoA axis.

Clause 10. The method of clause 9, wherein for each of the one or more spectrum values, (1) the spectrum value is further associated with a DoA estimate, and (2) the range-dependent maximum threshold is further based on the DoA estimate.

Clause 11. The method of clause 10, wherein for each of the one or more spectrum values, the range-dependent maximum threshold includes a TX gain component based on the DoA estimate and an RX gain component based on the DoA estimate.

Clause 12. The method of clause 9, wherein:
the array of modified spectrum values is used to generate the range estimate and the DoA estimate, and
the method further comprises performing a Doppler transform based on the array of modified spectrum values, to generate the velocity estimate.

Clause 13. The method of clause 1, further comprising, prior to identifying the one or more spectrum values from the array of spectrum values as exceeding the range-dependent maximum threshold:
generating a RADAR three-dimensional image;
based on the RADAR three-dimensional image, detecting one or more targets; and
storing a range estimate and a DoA estimate for each of the one or more detected targets,
wherein for each of the one or more spectrum values, (1) the spectrum value corresponds to a range estimate associated with one of the detected targets, (2) the range-dependent maximum threshold is further based on one or more of the stored DoA estimates associated with one or more of the detected targets located at the range estimate.

Clause 14. The method of clause 13, wherein for each of the one or more spectrum values, the range-dependent maximum threshold includes (1) a maximum TX gain component selected from one or more TX gain components based on the one or more of the stored DoA estimates associated with the one or more of the detected targets located at the range estimate and (2) a maximum RX gain component selected from one or more RX gain components based on the one or more of the stored DoA estimates associated with the one or more of the detected targets located at the range estimate.

Clause 15. An apparatus for reducing false alarms in RADAR processing, the apparatus comprising:
a memory; and
at least one processor coupled to the memory and configured to:
obtain a digital signal resulting from mixing (1) a received signal associated with reflection of a RADAR transmit signal and (2) a local version of the RADAR transmit signal;
perform one or more transforms using the digital signal to generate an array of spectrum values for a first domain spanning at least one of a range axis, a direction of arrival (DoA) axis, or a velocity axis;
identify one or more spectrum values from the array of spectrum values, wherein for each of the one or more spectrum values, (1) the spectrum value is associated with a range estimate, and (2) the spectrum value exceeds a range-dependent maximum threshold established based on a quartic function of the range estimate;
exclude, or obtain one or more reduced-magnitude values for, the one or more spectrum values identified as exceeding the range-dependent maximum threshold, to generate an array of modified spectrum values for the first domain spanning the at least one of the range axis, the DoA axis, or the velocity axis; and
use the array of modified spectrum values to generate a range estimate, a DoA estimate, or a velocity estimate, or any combination thereof.

Clause 16. The apparatus of clause 15, wherein a component of the range-dependent maximum threshold, based on the quartic function of the range estimate, comprises an expression $-40*\log_{10}*R$ decibels (dB), wherein R represents the range estimate.

Clause 17. The apparatus of clause 15, wherein the array of spectrum values comprises a three-dimensional array, and the first domain spans the range axis, the DoA axis, and the velocity axis.

Clause 18. The apparatus of clause 17, wherein for each of the one or more spectrum values, (1) the spectrum value is further associated with a DoA estimate, and (2) the range-dependent maximum threshold is further based on the DoA estimate.

Clause 19. The apparatus of clause 18, wherein for each of the one or more spectrum values, the range-dependent maximum threshold includes a TX gain component based on the DoA estimate and an RX gain component based on the DoA estimate.

Clause 20. The apparatus of clause 15, wherein the array of spectrum values comprises a one-dimensional array, and the first domain spans only the range axis.

Clause 21. The apparatus of clause 20, wherein the range-dependent maximum threshold further comprises a TX gain component independent of any DoA estimate and an RX gain component independent of any DoA estimate.

Clause 22. The apparatus of clause 20,
wherein the at least one processor is configured to use the array of modified spectrum values to generate the range estimate, and
wherein the at least one processor is configured to perform a Doppler transform and a DoA transform based on the array of modified spectrum values, to generate the DoA estimate and the velocity estimate.

23. The apparatus of clause 15, wherein the array of spectrum values comprises a two-dimensional array, and the first domain spans the range axis and the DoA axis.

Clause 24. The apparatus of clause 23, wherein for each of the one or more spectrum values, (1) the spectrum value is further associated with a DoA estimate, and (2) the range-dependent maximum threshold is further based on the DoA estimate.

Clause 25. The apparatus of clause 24, wherein for each of the one or more spectrum values, the range-dependent maximum threshold includes a TX gain component based on the DoA estimate and an RX gain component based on the DoA estimate.

Clause 26. The apparatus of clause 23,
wherein the at least one processor is configured to use the array of modified spectrum values to generate the range estimate and the DoA estimate, and
wherein the at least one processor is configured to perform a Doppler transform based on the array of modified spectrum values, to generate the velocity estimate.

Clause 27. The apparatus of clause 15,
wherein, prior to identifying the one or more spectrum values from the array of spectrum values as exceeding the range-dependent maximum threshold, the at least one processor is configured to:
generate a RADAR three-dimensional image;
based on the RADAR three-dimensional image, detect one or more targets; and
store a range estimate and a DoA estimate for each of the one or more detected targets;

wherein for each of the one or more spectrum values, (1) the spectrum value corresponds to a range estimate associated with one of the detected targets, (2) the range-dependent maximum threshold is further based on one or more of the stored DoA estimates associated with one or more of the detected targets located at the range estimate.

Clause 28. The apparatus of clause 27, wherein for each of the one or more spectrum values, the range-dependent maximum threshold includes (1) a maximum TX gain component selected from one or more TX gain components based on the one or more of the stored DoA estimates associated with the one or more of the detected targets located at the range estimate and (2) a maximum RX gain component selected from one or more RX gain components based on the one or more of the stored DoA estimates associated with the one or more of the detected targets located at the range estimate.

Clause 29. A non-transitory computer-readable medium storing instructions therein for execution by one or more processing units, comprising instructions to:

obtain a digital signal resulting from mixing (1) a received signal associated with reflection of a RADAR transmit signal and (2) a local version of the RADAR transmit signal;

perform one or more transforms using the digital signal to generate an array of spectrum values for a first domain spanning at least one of a range axis, a direction of arrival (DoA) axis, or a velocity axis;

identify one or more spectrum values from the array of spectrum values, wherein for each of the one or more spectrum values, (1) the spectrum value is associated with a range estimate, and (2) the spectrum value exceeds a range-dependent maximum threshold established based on a quartic function of the range estimate;

exclude, or obtain one or more reduced-magnitude values for, the one or more spectrum values identified as exceeding the range-dependent maximum threshold, to generate an array of modified spectrum values for the first domain spanning the at least one of the range axis, the DoA axis, or the velocity axis; and use the array of modified spectrum values to generate a range estimate, a DoA estimate, or a velocity estimate, or any combination thereof.

Clause 30. A system for reducing false alarms in RADAR processing, the system comprising:

means for obtaining a digital signal resulting from mixing (1) a received signal associated with reflection of a RADAR transmit signal and (2) a local version of the RADAR transmit signal;

means for performing one or more transforms using the digital signal to generate an array of spectrum values for a first domain spanning at least one of a range axis, a direction of arrival (DoA) axis, or a velocity axis;

means for identifying one or more spectrum values from the array of spectrum values, wherein for each of the one or more spectrum values, (1) the spectrum value is associated with a range estimate, and (2) the spectrum value exceeds a range-dependent maximum threshold established based on a quartic function of the range estimate;

means for excluding, or obtaining one or more reduced-magnitude values for, the one or more spectrum values identified as exceeding the range-dependent maximum threshold, to generate an array of modified spectrum values for the first domain spanning the at least one of the range axis, the DoA axis, or the velocity axis; and means for using the array of modified spectrum values to generate a range estimate, a DoA estimate, or a velocity estimate, or any combination thereof.

What is claimed is:

1. A method for reducing false alarms in RADAR processing, the method comprising:
    obtaining a digital signal resulting from mixing (1) a received signal associated with reflection of a RADAR transmit signal and (2) a local version of the RADAR transmit signal;
    performing one or more transforms using the digital signal to generate an array of spectrum values for a first domain spanning at least one of a range axis, a direction of arrival (DoA) axis, or a velocity axis;
    identifying one or more spectrum values from the array of spectrum values, wherein for each of the one or more spectrum values, (1) the spectrum value is associated with a range estimate, and (2) the spectrum value exceeds a range-dependent maximum threshold established based on a quartic function of the range estimate;
    excluding, or obtaining one or more reduced-magnitude values for, the one or more spectrum values identified as exceeding the range-dependent maximum threshold, to generate an array of modified spectrum values for the first domain spanning the at least one of the range axis, the DoA axis, or the velocity axis; and
    using the array of modified spectrum values to generate a range estimate, a DoA estimate, or a velocity estimate, or any combination thereof.

2. The method of claim 1, wherein a component of the range-dependent maximum threshold, based on the quartic function of the range estimate, comprises an expression $-40*\log_{10}*R$ decibels (dB), wherein R represents the range estimate.

3. The method of claim 1, wherein the array of spectrum values comprises a three-dimensional array, and the first domain spans the range axis, the DoA axis, and the velocity axis.

4. The method of claim 3, wherein for each of the one or more spectrum values, (1) the spectrum value is further associated with a DoA estimate, and (2) the range-dependent maximum threshold is further based on the DoA estimate.

5. The method of claim 4, wherein for each of the one or more spectrum values, the range-dependent maximum threshold includes a TX gain component based on the DoA estimate and an RX gain component based on the DoA estimate.

6. The method of claim 1, wherein the array of spectrum values comprises a one-dimensional array, and the first domain spans only the range axis.

7. The method of claim 6, wherein the range-dependent maximum threshold further comprises a TX gain component independent of any DoA estimate and an RX gain component independent of any DoA estimate.

8. The method of claim 6, wherein:
    the array of modified spectrum values is used to generate the range estimate, and
    the method further comprises performing a Doppler transform and a DoA transform based on the array of modified spectrum values, to generate the DoA estimate and the velocity estimate.

9. The method of claim 1, wherein the array of spectrum values comprises a two-dimensional array, and the first domain spans the range axis and the DoA axis.

10. The method of claim 9, wherein for each of the one or more spectrum values, (1) the spectrum value is further associated with a DoA estimate, and (2) the range-dependent maximum threshold is further based on the DoA estimate.

11. The method of claim 10, wherein for each of the one or more spectrum values, the range-dependent maximum threshold includes a TX gain component based on the DoA estimate and an RX gain component based on the DoA estimate.

12. The method of claim 9, wherein:
the array of modified spectrum values is used to generate the range estimate and the DoA estimate, and
the method further comprises performing a Doppler transform based on the array of modified spectrum values, to generate the velocity estimate.

13. The method of claim 1, further comprising, prior to identifying the one or more spectrum values from the array of spectrum values as exceeding the range-dependent maximum threshold:
generating a RADAR three-dimensional image;
based on the RADAR three-dimensional image, detecting one or more targets; and
storing a range estimate and a DoA estimate for each of the one or more detected targets,
wherein for each of the one or more spectrum values, (1) the spectrum value corresponds to a range estimate associated with one of the detected targets, (2) the range-dependent maximum threshold is further based on one or more of the stored DoA estimates associated with one or more of the detected targets located at the range estimate.

14. The method of claim 13, wherein for each of the one or more spectrum values, the range-dependent maximum threshold includes (1) a maximum TX gain component selected from one or more TX gain components based on the one or more of the stored DoA estimates associated with the one or more of the detected targets located at the range estimate and (2) a maximum RX gain component selected from one or more RX gain components based on the one or more of the stored DoA estimates associated with the one or more of the detected targets located at the range estimate.

15. An apparatus for reducing false alarms in RADAR processing, the apparatus comprising:
a memory; and
at least one processor coupled to the memory and configured to:
obtain a digital signal resulting from mixing (1) a received signal associated with reflection of a RADAR transmit signal and (2) a local version of the RADAR transmit signal;
perform one or more transforms using the digital signal to generate an array of spectrum values for a first domain spanning at least one of a range axis, a direction of arrival (DoA) axis, or a velocity axis;
identify one or more spectrum values from the array of spectrum values, wherein for each of the one or more spectrum values, (1) the spectrum value is associated with a range estimate, and (2) the spectrum value exceeds a range-dependent maximum threshold established based on a quartic function of the range estimate;
exclude, or obtain one or more reduced-magnitude values for, the one or more spectrum values identified as exceeding the range-dependent maximum threshold, to generate an array of modified spectrum values for the first domain spanning the at least one of the range axis, the DoA axis, or the velocity axis; and
use the array of modified spectrum values to generate a range estimate, a DoA estimate, or a velocity estimate, or any combination thereof.

16. The apparatus of claim 15, wherein a component of the range-dependent maximum threshold, based on the quartic function of the range estimate, comprises an expression $-40*\log_{10}*R$ decibels (dB), wherein R represents the range estimate.

17. The apparatus of claim 15, wherein the array of spectrum values comprises a three-dimensional array, and the first domain spans the range axis, the DoA axis, and the velocity axis.

18. The apparatus of claim 17, wherein for each of the one or more spectrum values, (1) the spectrum value is further associated with a DoA estimate, and (2) the range-dependent maximum threshold is further based on the DoA estimate.

19. The apparatus of claim 18, wherein for each of the one or more spectrum values, the range-dependent maximum threshold includes a TX gain component based on the DoA estimate and an RX gain component based on the DoA estimate.

20. The apparatus of claim 15, wherein the array of spectrum values comprises a one-dimensional array, and the first domain spans only the range axis.

21. The apparatus of claim 20, wherein the range-dependent maximum threshold further comprises a TX gain component independent of any DoA estimate and an RX gain component independent of any DoA estimate.

22. The apparatus of claim 20,
wherein the at least one processor is configured to use the array of modified spectrum values to generate the range estimate, and
wherein the at least one processor is configured to perform a Doppler transform and a DoA transform based on the array of modified spectrum values, to generate the DoA estimate and the velocity estimate.

23. The apparatus of claim 15, wherein the array of spectrum values comprises a two-dimensional array, and the first domain spans the range axis and the DoA axis.

24. The apparatus of claim 23, wherein for each of the one or more spectrum values, (1) the spectrum value is further associated with a DoA estimate, and (2) the range-dependent maximum threshold is further based on the DoA estimate.

25. The apparatus of claim 24, wherein for each of the one or more spectrum values, the range-dependent maximum threshold includes a TX gain component based on the DoA estimate and an RX gain component based on the DoA estimate.

26. The apparatus of claim 23,
wherein the at least one processor is configured to use the array of modified spectrum values to generate the range estimate and the DoA estimate, and
wherein the at least one processor is configured to perform a Doppler transform based on the array of modified spectrum values, to generate the velocity estimate.

27. The apparatus of claim 15,
wherein, prior to identifying the one or more spectrum values from the array of spectrum values as exceeding the range-dependent maximum threshold, the at least one processor is configured to:
generate a RADAR three-dimensional image;
based on the RADAR three-dimensional image, detect one or more targets; and
store a range estimate and a DoA estimate for each of the one or more detected targets;
wherein for each of the one or more spectrum values, (1) the spectrum value corresponds to a range estimate associated with one of the detected targets, (2) the range-dependent maximum threshold is further based on one or more of the stored DoA estimates associated with one or more of the detected targets located at the range estimate.

28. The apparatus of claim 27, wherein for each of the one or more spectrum values, the range-dependent maximum threshold includes (1) a maximum TX gain component selected from one or more TX gain components based on the one or more of the stored DoA estimates associated with the one or more of the detected targets located at the range estimate and (2) a maximum RX gain component selected from one or more RX gain components based on the one or more of the stored DoA estimates associated with the one or more of the detected targets located at the range estimate.

29. A non-transitory computer-readable medium storing instructions therein for execution by one or more processing units, comprising instructions to:
   obtain a digital signal resulting from mixing (1) a received signal associated with reflection of a RADAR transmit signal and (2) a local version of the RADAR transmit signal;
   perform one or more transforms using the digital signal to generate an array of spectrum values for a first domain spanning at least one of a range axis, a direction of arrival (DoA) axis, or a velocity axis;
   identify one or more spectrum values from the array of spectrum values, wherein for each of the one or more spectrum values, (1) the spectrum value is associated with a range estimate, and (2) the spectrum value exceeds a range-dependent maximum threshold established based on a quartic function of the range estimate;
   exclude, or obtain one or more reduced-magnitude values for, the one or more spectrum values identified as exceeding the range-dependent maximum threshold, to generate an array of modified spectrum values for the first domain spanning the at least one of the range axis, the DoA axis, or the velocity axis; and
   use the array of modified spectrum values to generate a range estimate, a DoA estimate, or a velocity estimate, or any combination thereof.

30. A system for reducing false alarms in RADAR processing, the system comprising:
   means for obtaining a digital signal resulting from mixing (1) a received signal associated with reflection of a RADAR transmit signal and (2) a local version of the RADAR transmit signal;
   means for performing one or more transforms using the digital signal to generate an array of spectrum values for a first domain spanning at least one of a range axis, a direction of arrival (DoA) axis, or a velocity axis;
   means for identifying one or more spectrum values from the array of spectrum values, wherein for each of the one or more spectrum values, (1) the spectrum value is associated with a range estimate, and (2) the spectrum value exceeds a range-dependent maximum threshold established based on a quartic function of the range estimate;
   means for excluding, or obtaining one or more reduced-magnitude values for, the one or more spectrum values identified as exceeding the range-dependent maximum threshold, to generate an array of modified spectrum values for the first domain spanning the at least one of the range axis, the DoA axis, or the velocity axis; and
   means for using the array of modified spectrum values to generate a range estimate, a DoA estimate, or a velocity estimate, or any combination thereof.

* * * * *